United States Patent
Giusti et al.

(10) Patent No.: US 11,204,694 B2
(45) Date of Patent: *Dec. 21, 2021

(54) RADAR SYSTEM FACILITATING EASE AND ACCURACY OF USER INTERACTIONS WITH A USER INTERFACE

(71) Applicant: Google LLC, Mountain View, CA (US)

(72) Inventors: Leonardo Giusti, San Francisco, CA (US); Ivan Poupyrev, Sunnyvale, CA (US); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,414

(22) Filed: Jan. 13, 2021

(65) Prior Publication Data

US 2021/0132788 A1    May 6, 2021

Related U.S. Application Data

(63) Continuation of application No. 16/884,943, filed on May 27, 2020, now Pat. No. 10,936,185, which is a
(Continued)

(51) Int. Cl.
*G06F 3/0488* (2013.01)
*G06K 9/00* (2006.01)
(Continued)

(52) U.S. Cl.
CPC ..... *G06F 3/04883* (2013.01); *G06K 9/00671* (2013.01); *G06T 19/006* (2013.01); *H04M 1/724* (2021.01); *H04M 2250/12* (2013.01)

(58) Field of Classification Search
CPC ............ G06F 3/04883; G06F 3/017; G06F 3/0484–0486; G06F 3/011; G06K 9/00671; G06T 19/006
See application file for complete search history.

(56) References Cited

U.S. PATENT DOCUMENTS 6,971,072 B1   11/2005   Stein
7,924,212 B2   4/2011   Benitez et al.
(Continued)

FOREIGN PATENT DOCUMENTS

CN   102906623   1/2013
CN   103858073   6/2014
(Continued)

OTHER PUBLICATIONS

"Corrected Notice of Allowance", U.S. Appl. No. 16/108,815, dated Dec. 8, 2020, 2 pages.
(Continued)

*Primary Examiner* — Michael Pervan
(74) *Attorney, Agent, or Firm* — Colby Nipper PLLC

(57) ABSTRACT

This document describes techniques and systems that enable a radar system facilitating ease and accuracy of user interactions with a user interface. The techniques and systems can be implemented in an electronic device, such as a smartphone, and use a radar field to accurately determine three-dimensional (3D) gestures that can be used in combination with other inputs, such as touch or voice inputs, to interact with the user interface. These techniques allow the user to make 3D gestures from a distance and enable seamless integration of touch and voice commands with 3D gestures to improve functionality and user enjoyment.

60 Claims, 13 Drawing Sheets

Related U.S. Application Data continuation of application No. 16/112,130, filed on Aug. 24, 2018, now Pat. No. 10,698,603.

(51) Int. Cl.
  *G06T 19/00* (2011.01)
  *H04M 1/724* (2021.01)

(56) References Cited

U.S. PATENT DOCUMENTS

| | | |
|---|---|---|
| 8,260,368 B2 | 9/2012 | Yin |
| 8,560,128 B2 | 10/2013 | Ruff et al. |
| 8,723,986 B1 | 5/2014 | Merrill |
| 8,803,697 B2 | 8/2014 | Rautiainen |
| 8,837,696 B2 | 9/2014 | Meriaz et al. |
| 9,075,435 B1 | 7/2015 | Noble et al. |
| 9,569,003 B2 | 2/2017 | Rofougaran et al. |
| 9,589,565 B2 | 3/2017 | Boies et al. |
| 9,600,177 B2 | 3/2017 | Iyer et al. |
| 9,632,584 B2 | 4/2017 | Dodge |
| 9,747,072 B2 | 8/2017 | Noble et al. |
| 9,811,164 B2 | 11/2017 | Poupyrev |
| 9,921,657 B2 | 3/2018 | Sprenger et al. |
| 10,217,488 B1 | 2/2019 | Huang |
| 10,698,603 B2 | 6/2020 | Giusti et al. |
| 10,761,611 B2 | 9/2020 | Giusti et al. |
| 10,770,035 B2 | 9/2020 | Giusti et al. |
| 10,788,880 B2 | 9/2020 | Giusti et al. |
| 10,890,653 B2 | 1/2021 | Giusti |
| 10,930,251 B2 | 2/2021 | Giusti et al. |
| 10,936,185 B2 | 3/2021 | Giusti et al. |
| 2004/0100497 A1 | 5/2004 | Quillen et al. |
| 2005/0002530 A1 | 1/2005 | Kogan |
| 2005/0128124 A1 | 6/2005 | Greneker et al. |
| 2005/0242984 A1 | 11/2005 | Waters |
| 2007/0015559 A1 | 1/2007 | Zalewski et al. |
| 2007/0117625 A1 | 5/2007 | Marks et al. |
| 2007/0202858 A1 | 8/2007 | Yu |
| 2008/0029316 A1 | 2/2008 | Jaeger et al. |
| 2008/0055105 A1 | 3/2008 | Blum et al. |
| 2009/0228841 A1 | 9/2009 | Hildreth |
| 2009/0237371 A1 | 9/2009 | Kim |
| 2009/0322690 A1 | 12/2009 | Hiltunen et al. |
| 2010/0017722 A1 | 1/2010 | Cohen |
| 2011/0181509 A1 | 7/2011 | Rautiainen et al. |
| 2011/0181510 A1 | 7/2011 | Hakala et al. |
| 2011/0221667 A1 | 9/2011 | Lee |
| 2011/0237274 A1 | 9/2011 | Wong et al. |
| 2011/0313768 A1 | 12/2011 | Klein et al. |
| 2012/0280900 A1 | 11/2012 | Wang et al. |
| 2013/0023248 A1 | 1/2013 | Lee |
| 2013/0053007 A1 | 2/2013 | Cosman et al. |
| 2013/0057571 A1 | 3/2013 | Harris |
| 2013/0120458 A1 | 5/2013 | Celebisoy et al. |
| 2013/0241823 A1 | 9/2013 | Pryor |
| 2013/0300671 A1 | 11/2013 | Hallerström Sjöstedt et al. |
| 2014/0267130 A1 | 9/2014 | Hwang et al. |
| 2014/0315531 A1 | 10/2014 | Joong et al. |
| 2014/0347188 A1 | 11/2014 | Alameh et al. |
| 2014/0379341 A1 | 12/2014 | Seo et al. |
| 2014/0380249 A1 | 12/2014 | Fleizach |
| 2015/0036999 A1 | 2/2015 | Batur et al. |
| 2015/0145993 A1 | 5/2015 | Scalisi |
| 2015/0186569 A1 | 7/2015 | Sekine et al. |
| 2015/0187137 A1 | 7/2015 | Mullins |
| 2015/0277569 A1 | 10/2015 | Sprenger et al. |
| 2015/0346820 A1 | 12/2015 | Poupyrev et al. |
| 2015/0365540 A1 | 12/2015 | Davis et al. |
| 2015/0370443 A1 | 12/2015 | Ben-Bassat |
| 2015/0370472 A1 | 12/2015 | Privault et al. |
| 2016/0026327 A1 | 1/2016 | Park et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0062590 A1 | 3/2016 | Karunamuni et al. |
| 2016/0098089 A1 | 4/2016 | Poupyrev |
| 2016/0140763 A1 | 5/2016 | Seichter et al. |
| 2016/0162145 A1 | 6/2016 | Rivers et al. |
| 2016/0234369 A1 | 8/2016 | Jung et al. |
| 2016/0241720 A1 | 8/2016 | Cheatham et al. |
| 2016/0252607 A1 | 9/2016 | Saboo et al. |
| 2016/0259037 A1 | 9/2016 | Molchanov et al. |
| 2016/0358588 A1 | 12/2016 | O'Neill |
| 2017/0040002 A1 | 2/2017 | Basson et al. |
| 2017/0097413 A1 | 4/2017 | Gillian et al. |
| 2017/0235458 A1 | 8/2017 | Tsurumi |
| 2017/0289766 A1 | 10/2017 | Scott et al. |
| 2017/0289954 A1 | 10/2017 | Mese et al. |
| 2017/0308131 A1 | 10/2017 | Geva |
| 2017/0328997 A1 | 11/2017 | Silverstein et al. |
| 2017/0329449 A1 | 11/2017 | Silverstein et al. |
| 2017/0349184 A1 | 12/2017 | Tzirkel-Hancock et al. |
| 2018/0018965 A1 | 1/2018 | Daley |
| 2018/0032997 A1 | 2/2018 | Gordon et al. |
| 2018/0098351 A1 | 4/2018 | Amel et al. |
| 2018/0120946 A1 | 5/2018 | Cho |
| 2018/0224980 A1 | 8/2018 | Avila et al. |
| 2018/0329049 A1 | 11/2018 | Amihood et al. |
| 2018/0374143 A1 | 12/2018 | Williamson et al. |
| 2019/0286912 A1 | 9/2019 | Chan et al. |
| 2020/0057504 A1 | 2/2020 | Lien et al. |
| 2020/0064445 A1 | 2/2020 | Amihood et al. |
| 2020/0064458 A1 | 2/2020 | Giusti et al. |
| 2020/0064996 A1 | 2/2020 | Giusti et al. |
| 2020/0066236 A1 | 2/2020 | Giusti et al. |
| 2020/0125158 A1 | 4/2020 | Giusti et al. |
| 2020/0150771 A1 | 5/2020 | Giusti et al. |
| 2020/0193942 A1 | 6/2020 | Giusti et al. |
| 2020/0272322 A1 | 8/2020 | Zhu et al. |
| 2020/0285383 A1 | 9/2020 | Giusti et al. |
| 2020/0372879 A1 | 11/2020 | Giusti et al. |
| 2021/0026434 A1 | 1/2021 | Giusti et al. |
| 2021/0072370 A1 | 3/2021 | Giusti et al. |

FOREIGN PATENT DOCUMENTS

| | | |
|---|---|---|
| CN | 204145834 | 2/2015 |
| CN | 104793731 | 7/2015 |
| CN | 105264461 | 1/2016 |
| CN | 107077169 | 8/2017 |
| CN | 107765846 | 3/2018 |
| CN | 108334199 | 7/2018 |
| EP | 1309211 | 5/2003 |
| EP | 2560145 | 2/2013 |
| EP | 2637079 | 9/2013 |
| EP | 2887092 | 6/2015 |
| GB | 2554957 | 4/2018 |
| JP | H11338120 | 12/1999 |
| JP | 2001033550 | 2/2001 |
| JP | 2006013819 | 1/2006 |
| JP | 2010038607 | 2/2010 |
| JP | 2012048720 | 3/2012 |
| JP | 2013125328 | 6/2013 |
| JP | 2014197317 | 10/2014 |
| JP | 2015141588 | 8/2015 |
| JP | 2016205907 | 12/2016 |
| JP | 2017111711 | 6/2017 |
| JP | 2018116653 | 7/2018 |
| JP | 2018527558 | 9/2018 |
| KR | 20160128318 | 11/2016 |
| KR | 20160148640 | 12/2016 |
| TW | 201228332 | 7/2012 |
| TW | 201445029 | 12/2014 |
| TW | 201606572 | 2/2016 |
| TW | I610084 | 3/2016 |
| TW | 201727439 | 8/2017 |
| WO | 2011149659 | 12/2011 |
| WO | 2016017978 | 2/2016 |
| WO | 2018004757 | 1/2018 |
| WO | 2018118895 | 6/2018 |
| WO | 2018208958 | 11/2018 |
| WO | 2020040966 | 2/2020 |
| WO | 2020040968 | 2/2020 |

(56) References Cited

FOREIGN PATENT DOCUMENTS

| WO | 2020040970 | 2/2020 |
|---|---|---|
| WO | 2020086215 | 4/2020 |
| WO | 2020101810 | 5/2020 |

OTHER PUBLICATIONS

"Corrected Notice of Allowance", U.S. Appl. No. 16/108,815, dated Dec. 17, 2020, 2 pages.
"Corrected Notice of Allowance", U.S. Appl. No. 16/802,024, dated Dec. 23, 2020, 3 pages.
"EP Appeal Decision", European Application No. 10194359.5, May 28, 2019, 20 pages.
"Extended European Search Report", EP Application No. 20172743.5, dated Sep. 9, 2020, 11 pages.
"First Action Interview Office Action", U.S. Appl. No. 16/189,346, dated Jan. 14, 2020, 3 Pages.
"First Action Interview Office Action", U.S. Appl. No. 16/109,534, dated Mar. 17, 2020, 3 Pages.
"Foreign Office Action", EP Application No. 19755482.7, dated Jun. 17, 2020, 4 pages.
"Foreign Office Action", TW Application No. 108123887, dated Jul. 15, 2020, 8 pages.
"Foreign Office Action", CN Application No. 201980004742.2, dated Aug. 5, 2020, 16 pages.
"Foreign Office Action", TW Application No. 108123886, dated Aug. 26, 2020, 23 pages.
"Foreign Office Action", EP Application No. 19755482.7, dated Sep. 15, 2020, 11 pages.
"Foreign Office Action", Japanese Application No. 2020520030, dated Jan. 12, 2021, 5 pages.
"Foreign Office Action", JP Application No. 2020-090667, dated Nov. 17, 2020, 6 pages.
"Foreign Office Action", Korean Application No. 1020207008514, dated May 15, 2020, 6 pages.
"Foreign Office Action", TW Application No. 108123712, dated Aug. 17, 2020, 12 pages.
"Foreign Office Action", Taiwanese Application No. 108123712, dated Dec. 22, 2020, 2 pages.
"Foreign Office Action", JP Application No. 2020-517425, dated Nov. 24, 2020, 3 pages.
"Galaxy S4 Air Gesture", Galaxy S4 Guides, retrieved from: https://allaboutgalaxys4.com/galaxy-s4-features-explained/air-gesture/ on Sep. 3, 2019, 4 pages.
"International Search Report and Written Opinion", PCT Application No. PCT/US2019/045128, dated Jan. 14, 2020, 22 pages.
"International Search Report and Written Opinion", PCT Application No. PCT/US2019/045144, dated Jan. 2, 2020, 18 pages.
"International Search Report and Written Opinion", PCT Application No. PCT/US2019/053568, dated Dec. 20, 2019, 14 pages.
"International Search Report and Written Opinion", PCT Application No. PCT/US2019/053602, dated Dec. 6, 2019, 23 pages.
"International Search Report and Written Opinion", PCT Application No. PCT/US2019/045142, dated Feb. 10, 2020, 19 pages.
"Invitation to Pay Additional Fees", PCT Application No. PCT/US2019/045144, dated Oct. 28, 2019, 10 pages.
"Invitation to Pay Additional Fees", PCT Application No. PCT/US2019/045142, dated Oct. 29, 2019, 10 pages.
"Invitation to Pay Additional Fees", PCT Application No. PCT/US2019/045128, dated Nov. 11, 2019, 16 pages.
"Micropower Impulse Radar (MIR)", Ohio State et. al., retrieved from the internet: http:..web.cse.ohio-state.edu/siefast/nest/nest_webpage/posters/OSU-poster-alineinthestand-MIR.pdf, Sep. 1, 2003, 1 page.
"Non-Final Office Action", U.S. Appl. No. 16/112,130, dated Sep. 20, 2019, 14 Pages.
"Non-Final Office Action", U.S. Appl. No. 16/802,024, dated Oct. 7, 2020, 10 Pages.
"Notice of Allowance", U.S. Appl. No. 16/112,130, dated Feb. 19, 2020, 8 Pages.
"Notice of Allowance", U.S. Appl. No. 16/189,346, dated Apr. 15, 2020, 6 Pages.
"Notice of Allowance", U.S. Appl. No. 16/109,534, dated Apr. 30, 2020, 5 Pages.
"Notice of Allowance", U.S. Appl. No. 16/166,900, dated May 15, 2020, 7 Pages.
"Notice of Allowance", U.S. Appl. No. 16/108,815, dated Sep. 15, 2020, 7 Pages.
"Notice of Allowance", U.S. Appl. No. 16/884,943, dated Oct. 28, 2020, 11 pages.
"Notice of Allowance", U.S. Appl. No. 16/802,024, dated Dec. 11, 2020, 5 pages.
"Position Sensors", https://developer.android.com/guide/topics/sensors/sensors_position.html, downloaded Mar. 22, 2018, 5 pages.
"Pre-Interview Communication", U.S. Appl. No. 16/109,534, dated Feb. 19, 2020, 3 Pages.
"Pre-Interview Communication", U.S. Appl. No. 16/166,900, dated Mar. 19, 2020, 4 Pages.
"Pre-Interview Communication", U.S. Appl. No. 16/189,346, dated Dec. 13, 2019, 5 Pages.
"Pre-Interview Communication", U.S. Appl. No. 16/108,815, dated Jun. 8, 2020, 3 pages.
"Restriction Requirement", U.S. Appl. No. 16/109,534, dated Jan. 7, 2020, 6 Pages.
"Samsung Galaxy S4 Air Gestures", Video retrieved from https://www.youtube.com/watch?v=375Hb87yGcg, May 7, 2013, 4 pages.
"Supplemental Notice of Allowance", U.S. Appl. No. 16/884,943, dated Dec. 7, 2020, 2 pages.
Cravotta, "Optimizing Proximity Sensing for Consumer Electronics Applications", Apr. 26, 2012, 7 pages.
Lien, et al., "Soli: Ubiquitous Gesture Sensing with Millimeter Wave Radar", ACM Trans. Graph., vol. 35, No. 4, Article 142, Jul. 1, 2016, 19 pages.
Paulson, et al., "Ultra-Wideband Radar Methods and Techniques of Medical Sensing and Imaging", SPIE, PO Box 10 Bellingham, WA, 98227-0010, USA, Sep. 2, 2003, XP040212116, 12 pages.
"Corrected Notice of Allowance", U.S. Appl. No. 16/884,943, dated Jan. 26, 2021, 2 pages.
"Corrected Notice of Allowance", U.S. Appl. No. 16/802,024, dated Jan. 28, 2021, 2 pages.
"Foreign Office Action", TW Application No. 108123886, dated Mar. 5, 2021, 21 pages.
"International Preliminary Report on Patentability", Application No. PCT/US2019/045142, dated Feb. 23, 2021, 11 pages.
"International Preliminary Report on Patentability", Application No. PCT/US2019/045144, dated Feb. 23, 2021, 11 pages.
"International Preliminary Report on Patentability", Application No. PCT/US2019/045128, dated Mar. 2, 2021, 15 pages.
"Foreign Office Action", KR Application No. 10-2020-7013505, dated Jul. 5, 2021, 6 pages.
"Foreign Office Action", KR Application No. 10-2020-7033558, dated Jul. 5, 2021, 6 pages.
"International Preliminary Report on Patentability", Application No. PCT/US2019/053602, dated Apr. 27, 2021, 15 pages.
"International Preliminary Report on Patentability", Application No. PCT/US2019/053568, dated May 18, 2021, 8 pages.
"Notice of Allowance", U.S. Appl. No. 16/986,062, dated Jul. 12, 2021, 8 pages.
"Foreign Notice of Allowance", KR Application No. 10-2020-7033558, dated Sep. 6, 2021, 2 pages.
"Foreign Office Action", TW Application No. 108123886, dated Jul. 29, 2021, 16 pages.
"Foreign Office Action", IN Application No. 202047011909, dated Aug. 4, 2021, 6 pages.
"Non-Final Office Action", U.S. Appl. No. 17/035,059, dated Aug. 5, 2021, 6 pages.
"Non-Final Office Action", U.S. Appl. No. 16/950,248, dated Sep. 22, 2021, 15 pages.

RADAR SYSTEM FACILITATING EASE AND ACCURACY OF USER INTERACTIONS WITH A USER INTERFACE

RELATED APPLICATIONS

This application is a continuation application of U.S. application Ser. No. 16/884,943, filed May 27, 2020, which is a continuation application of U.S. application Ser. No. 16/112,130, filed Aug. 24, 2018, now U.S. Pat. No. 10,698,603, the disclosures of which are incorporated by reference herein in their entirety.

BACKGROUND

Electronic devices, such as smartphones, are used for communication, navigation, shopping, game-play, augmented-reality (AR) interactions, and many other functions. Users typically interact with applications on their electronic devices with touch inputs. Because of the wide range of functions these applications can provide, the need for users to provide multi-stage or otherwise complex input has become increasingly common. Gesture recognition techniques have successfully enabled less-complex gesture interaction with electronic devices when the gestures are made through device surfaces, such as touchscreens and touchpads. Interacting with an electronic device to provide more-complex inputs with a touch input interface, however, can be inconvenient, ineffective, and uncomfortable.

AR environments, in particular, can pose challenges for users. It can be difficult to manipulate three-dimensional (3D) objects using a two-dimensional (2D) touchscreen. For example, to manipulate a 3D AR object related to a particular real object, the user must use one hand to keep the electronic device steady (so the AR object remains framed in the display), while using the other hand to interact with the AR object via a 2D touchscreen. This can cause frustration, discomfort, and inaccurate or incomplete input. Thus, users may not realize the full potential of their electronic devices because of the limitations of touch input methods.

SUMMARY

This document describes techniques and systems that enable a radar system facilitating ease and accuracy of user interactions with a user interface. The techniques and systems use a radar field to accurately determine three-dimensional (3D) gestures that can be used to interact with augmented-reality (AR) objects that are presented on a display of an electronic device, such as a smartphone. These techniques allow the user to make 3D gestures from a distance—the user does not have to hold the electronic device steady while touching the screen and the gestures do not obstruct the user's view of the AR objects presented on the display.

Aspects described below include a smartphone comprising a display, a radar system, one or more computer processors, and one or more computer-readable media. The radar system is implemented at least partially in hardware and provides a radar field. The radar system also senses reflections from an object in the radar field and analyzes the reflections from the object in the radar field. The radar system further provides, based on the analysis of the reflections, radar data. The one or more computer-readable media include stored instructions that can be executed by the one or more computer processors to implement a radar-based application. The radar-based application presents an augmented-reality (AR) element through the display of the smartphone. The AR element includes a touch input control and is related to a real object. An image of the real object is presented on the display of the smartphone. In response to a determination, based on the radar data, that the object in the radar field is moving toward the display, the radar-based application maintains the touch input control at a fixed location on the display.

Aspects described below also include a system comprising an electronic device that includes a display, a radar system, one or more computer processors, and one or more computer-readable media. The radar system is implemented at least partially in hardware and provides a radar field. The radar system senses, at a first time, reflections from an object in the radar field. The radar system also analyzes the reflections from the object in the radar field and provides, based on the analysis of the reflections, radar data. The one or more computer-readable media include stored instructions that can be executed by the one or more computer processors to implement a radar-based application. The radar-based application presents an augmented-reality (AR) element through the display of the electronic device. The radar-based application also receives, at a second time that is later than the first time, an input selecting the AR element. Further, the radar-based application determines, based on the radar data, a gesture by the object in the radar field and performs an action related to the selected AR element. The performed action corresponds to the determined gesture.

Aspects described below also include a method, implemented in an electronic device that includes a display, a radar system, and a radar-based application. The method comprises providing, by the radar system, a radar field and sensing, by the radar system, reflections from an object in the radar field. The method also includes analyzing the reflections from the object in the radar field and providing, based on the analysis of the reflections and by the radar system, radar data. The method also includes presenting, by the radar-based application, an augmented-reality (AR) element through the display of the electronic device. The AR element includes a touch input control and is related to a real object, an image of which is presented on the display. In response to a determination, based on the radar data, that the object in the radar field is moving toward the display, the touch input control is maintained at a fixed location on the display.

Aspects described below also include a system comprising an electronic device and means for providing a radar field and determining that an object in the radar field is moving toward the electronic device. The system presents an augmented-reality (AR) element through a display of the electronic device. The AR element includes a touch input control and is related to a real object, an image of which is presented on the display of the electronic device. The system further includes means for maintaining the touch input control at a fixed location on the display of the electronic device in response to the determination that the object in the radar field is moving toward the display.

This summary is provided to introduce simplified concepts concerning a radar system facilitating ease and accuracy of user interactions with a user interface, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a radar system facilitating ease and accuracy of user interactions with a user interface are described in this document with reference to the following drawings. The same numbers are used throughout the drawings to reference like features and components.

DETAILED DESCRIPTION

Overview

Figure 1:
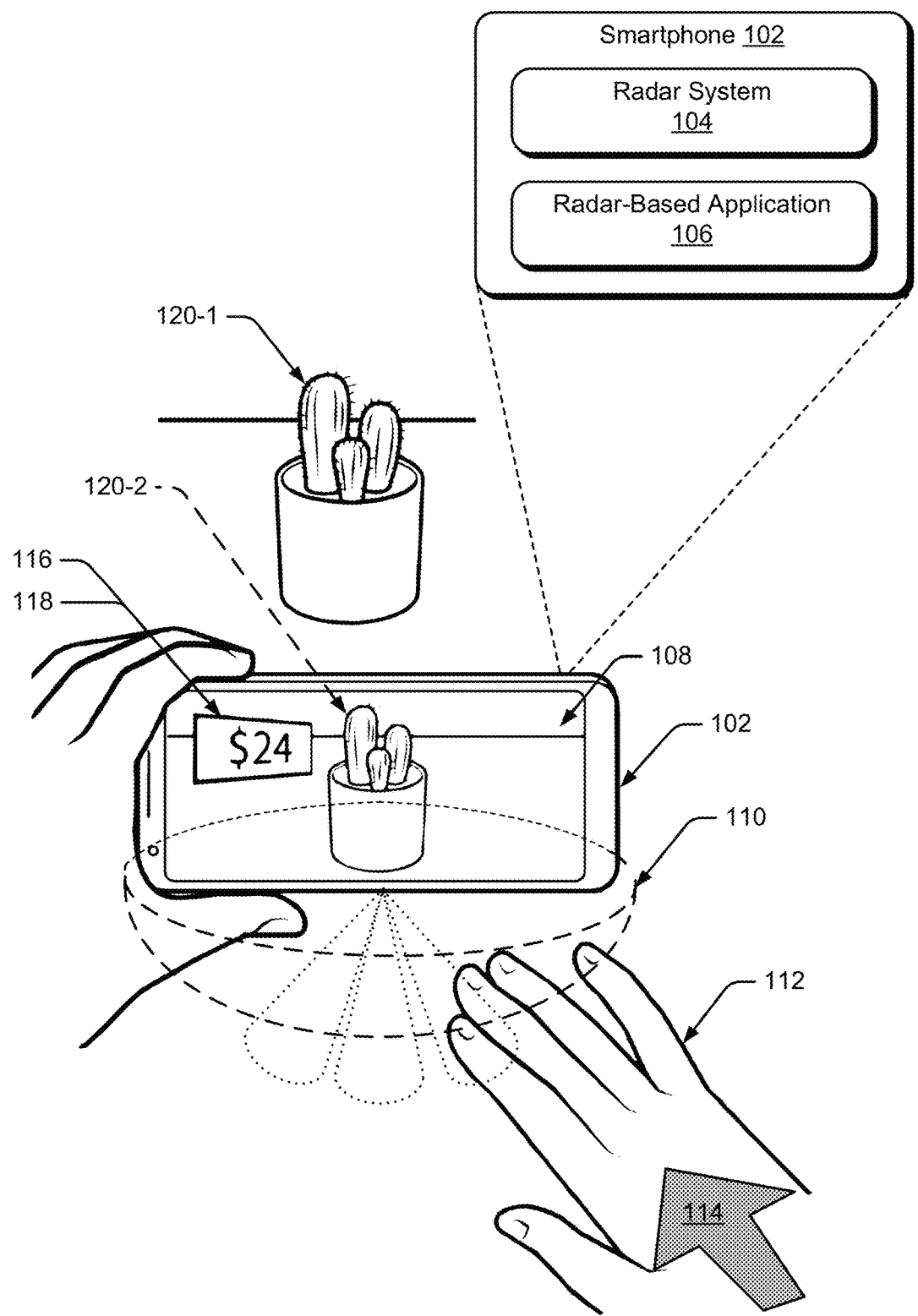
FIG. 1 illustrates an example environment in which techniques enabling a radar system facilitating ease and accuracy of user interactions with a user interface can be implemented.

This document describes techniques and systems that enable a radar system facilitating ease and accuracy of user interactions with a user interface. As noted, making complex inputs for augmented-reality (AR) applications using a touch input interface can be challenging because it is difficult to manipulate three-dimensional (3D) objects using a two-dimensional (2D) touchscreen. Thus, users may not realize the full potential of their AR applications because of the limitations of touch input methods. The techniques and systems employ a radar field to accurately determine three-dimensional (3D) gestures (e.g., a gesture that comprises one or more movements, in any direction, within a 3D space illuminated by a radar field). The 3D gestures can be used to interact with augmented-reality (AR) objects. Unless indicated otherwise by a particular context, increased accuracy refers to an increased degree of refinement, an increased conformity to truth, or both the increased degree of refinement and the increased conformity to truth. Because the techniques and systems use the radar field to enable an electronic device to recognize gestures made in a 3D space around the electronic device, the user does not have to touch the screen or obstruct the view of the objects presented on the display.

The techniques and systems can enable the electronic device to recognize both the 3D gestures and two-dimensional (2D) touch inputs in AR environments. Often, AR content is related to real objects. Thus, when a user moves a device around to view real objects that are AR-enabled, the AR content may be presented on a display, as 2D touch input controls, while the real object is framed in the display. For example, AR content for a decorative plant in a furniture store may include product information and purchase options. Using the radar field with the described techniques, the electronic device can determine that a user is reaching toward the 2D touch input controls on the display and fix or lock the touch input controls to the 2D touchscreen at a particular location. This allows the user to interact with the controls, even if the user moves the electronic device so that the real object is no longer framed in the display. Additionally, the techniques and systems can enable the device to determine 3D gestures that can be used to manipulate AR objects in three dimensions. The techniques thereby improve the user's efficiency, work flow, and enjoyment when using AR applications by enabling convenient and natural 3D gestures for interacting with 3D objects without having to obstruct the user's view.

Consider, for example, an electronic device that includes a radar-based application with an AR interface that provides added functionality when shopping. For example, the radar-based application may allow a user to view real objects in a store and display AR objects associated with the real objects, such as a virtual price tag or a link that allows the user to add the real object to a virtual shopping cart. In this example, the electronic device may include multiple cameras to enable the AR interface. A conventional AR interface is configured primarily for "discovery" (e.g., panning around a real environment to display whatever AR content is available). Thus, the user may move the device around in the real environment and touch-activated AR content related to the real object displayed on the screen can be presented on the screen near the displayed real object (e.g., an "add to cart" button). The conventional AR interface, however, is typically not convenient for touch interactions on a touchscreen. For example, to interact with the AR content, the user must try to hold the device steady with one hand while reaching toward the device with the other hand. This can obstruct the user's view of the display or cause the user to move the device so that the real object is no longer displayed, which causes the radar-based application to stop displaying the AR content. Consistently difficult or inconvenient interactions with the AR interface can reduce the user's efficiency, the effectiveness of the gestures, and the quality of the user's experience with the device and applications.

Contrast these conventional techniques with the systems and techniques described in this document, which can improve efficiency and usability in several areas. For instance, in the example above, the user is moving the device around in the real environment with a first hand, and touch-activated AR content related to a real object is presented on the screen near the displayed real object (e.g., an "add to cart" button). In this situation, the electronic device may include a radar system that can provide a radar field that extends into an area around the device (e.g., a five- or eight-foot radius around the device, the area most often including the space "behind the camera" that encompasses the user's other hand) The radar sensors can use radar signals reflected from objects that enter the radar field to detect the user's other hand reaching toward the electronic device. Upon detecting this reach, the electronic device can fix the AR content at a particular location so that the AR content does not move or disappear, even if the user keeps moving the device.

In this way, the described techniques and systems allow easy and convenient interaction with touch-based AR content and applications. The user can enjoy the discoverability features of AR applications and still easily interact with touch-based AR content. This can improve efficiency and reduce user frustration, such as having to reframe objects to access AR content, which increases the quality of the user experience. Further, power consumption of the radar system may be substantially less than some conventional techniques that may use multiple cameras to provide the AR interface and determine if the user is reaching toward the electronic device.

These are but a few examples of how the techniques and devices described herein may be used to allow users to interact with AR applications and objects with both 3D and 2D gestures. Other examples and implementations of which are described throughout this document. The document now turns to an example environment, after which example systems, apparatuses, methods, and components are described.

Operating Environment

FIG. 1 illustrates an example environment 100 in which techniques enabling a radar system facilitating ease and accuracy of user interactions with a user interface can be implemented. The example environment 100 includes a smartphone 102, which includes, or is associated with, a radar system 104, a radar-based application 106, and a display 108. Some embodiments of the radar system 104 are particularly advantageous as applied in the context of smartphones, such as the smartphone 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of a smartphone for which fine radar-detected hand gestures is required, it is to be appreciated that the applicability of the features and advantages of the present invention is not necessarily so limited, and other embodiments involving other types of electronic devices may also be within the scope of the present teachings.

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the smartphone 102 to sense and analyze reflections from an object 112 in the radar field 110. The object 112 may be any of a variety of objects that the radar system 104 can sense and analyze reflections from, such as wood, plastic, metal, fabric, or human body parts (e.g., a hand of a user of the smartphone 102). Based on the analysis of the reflections, the radar system 104 can provide radar data that includes various types of information associated with the radar field 110 and the reflections from the object 112, as described below with reference to FIGS. 3-6 (e.g., the radar system 104 can pass the radar data to other entities, such as the radar-based application 106). Further, based on the radar data, the radar system 104, the radar-based application 106, or another entity, can determine that the object 112 in the radar field 110 is moving toward the display 108 (as shown by a shaded arrow 114).

It should be noted that the radar data may be continuously or periodically provided over time, based on the sensed and analyzed reflections from the object 112 in the radar field 110. A position of the object 112 can change over time (e.g., the object 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The radar-based application 106 can also present an augmented-reality (AR) element 116 through the display 108. The AR element 116 includes a touch input control 118 and is related to a real object 120-1 that is visible through the display 108. When touched, the touch input control 118 may provide additional details about the real object 120-1 (e.g., dimensions, weight, or technical specifications), a link to purchase the real object 120-1, or a list of items related to the real object 120-1. As shown in FIG. 1, the AR element 116 is a virtual price tag that includes the touch input control 118. In this way, the user can touch the AR element 116, and the touch input control 118 presents additional AR content.

In some implementations, the radar-based application 106 may be an AR application that can present, on the display 108, both an image of the real object 120-1 and the AR element 116 that is related to the real object 120-1. For example, as shown in FIG. 1, the real object 120-1 is a decorative plant, shown both in the real environment and as an image 120-2 on the display 108 (the image 120-2 is indicated with a dashed-line arrow). In some implementations, the radar-based application 106 presents the image 120-2 of the real object 120-1 in real time (or near-real time). The real or near-real time presentation may be accomplished, for example, via one or more image-capture devices included with, or separate from but in communication with, the smartphone 102.

In response to the determination that the object 112 in the radar field 110 is moving toward the display 108, the radar-based application 106 can provide the touch input control 118 at a fixed location on the touchscreen of the smartphone 102. In some implementations, the radar-based application 106 can maintain the fixed location of the touch input control 118 even when the image 120-2 of the real object 120-1 is itself no longer visible in the display 108. Further, the radar-based application 106 may, responsive to the touch input control 118 at the fixed location not being touched within a threshold time of the determination that the object 112 in the radar field 110 is moving toward the display 108, stop providing the touch input control at the fixed location. For example, based on the touch input control 118 not being touched within the threshold time, the radar-based application 106 may return to a default mode, the radar-based application 106 may stop presenting the touch input control 118 (e.g., the touch input control disappears), or the radar-based application 106 may continue to present the touch input control 118, not at the fixed location, but at whatever location is appropriate to content being presented on the display 108. The threshold time may be any appropriate time, such as 1.5 seconds (s), 2 s, or 3 s. In still other implementations, the radar-based application 106 may provide the touch input control at a fixed location if the object 112 in the radar field 110 is determined to be moving toward the display 108 at a velocity that exceeds a threshold velocity (e.g., 0.25 feet/second (fps), 0.5 fps, or 0.75 fps). Thus, the smartphone 102, along with the radar system 104 and the radar-based application 106, work together to enable users of AR applications to efficiently and conveniently use touch inputs in an AR environment.

Assume, for example, that the smartphone 102 includes applications that include AR features and functionality. To access at least some of the AR functionality, the user must keep a real object framed in the display 108 of the smartphone 102 while reaching for, and touching, the display 108 to activate various touch input controls. This can present some challenges to the user, because reaching toward the display 108 may obstruct the user's view of the display 108, making it difficult to interact with the controls. Some users may also have difficulty holding some devices steady, especially large or heavy devices. Further, if the user moves the smartphone 102 so that the real object is no longer framed, the AR controls may no longer be displayed. Consider, in contrast, the radar system 104, which provides the radar field 110, which enables the radar system 104 (or another entity, such as the radar-based application 106) to automatically determine when the user reaches toward the display 108 and then seamlessly and automatically freeze or fix the controls on the display 108. As is readily apparent, the radar system 104 can make an AR interface substantially easier and more convenient to use, and provide an improved experience compared with a device that uses a conventional AR interface.

Figure 2:
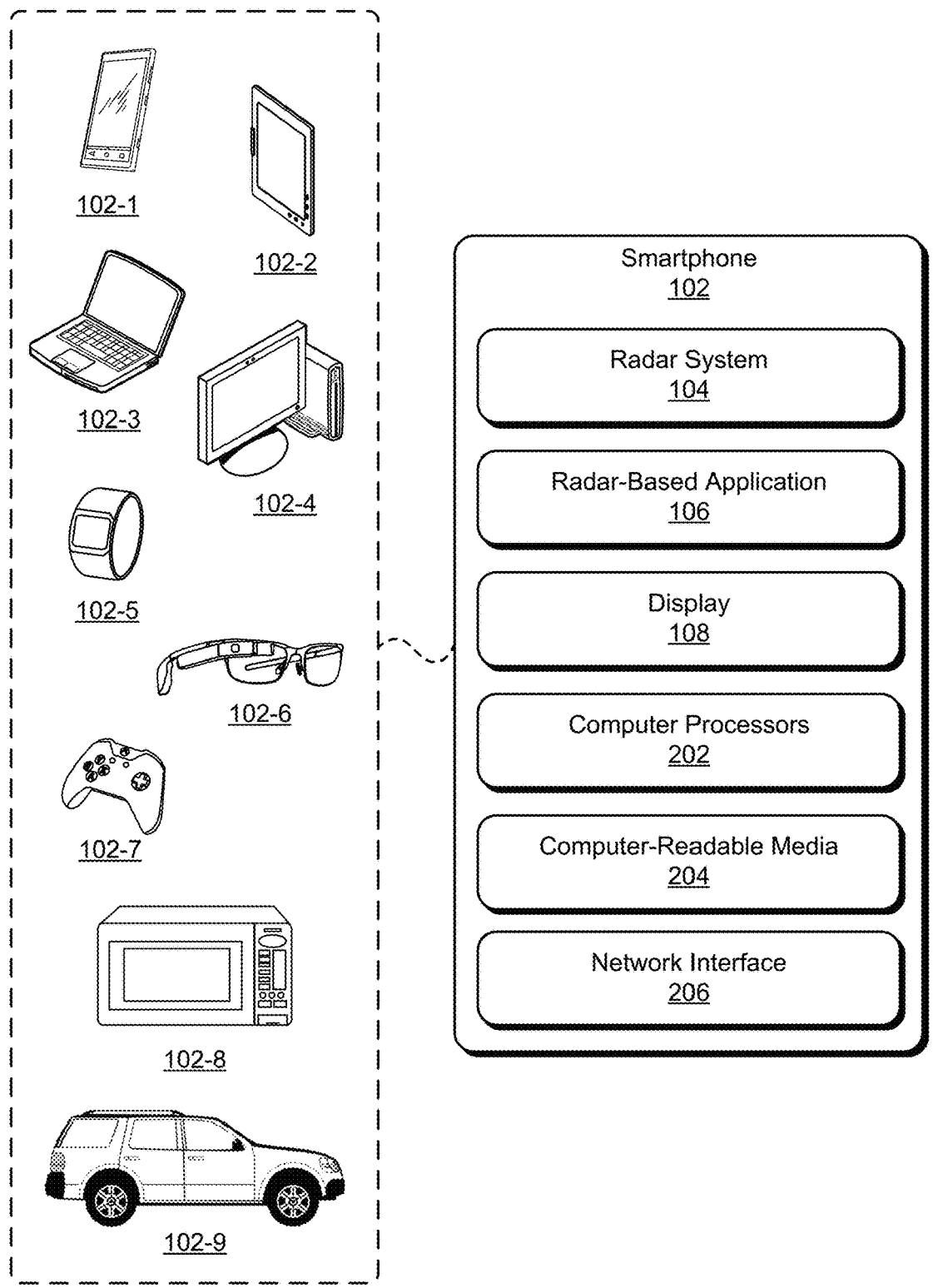
FIG. 2 illustrates an example implementation of the smartphone of FIG. 1 that includes a radar system and can implement a radar system facilitating ease and accuracy of user interactions with a user interface.

In more detail, consider FIG. 2, which illustrates an example implementation 200 of the smartphone 102 (including the radar system 104, the radar-based application 106, and the display 108). The smartphone 102 of FIG. 2 is illustrated to include other non-limiting example devices that can implement a radar system facilitating ease and accuracy of user interactions with a user interface, including a mobile phone 102-1, a tablet 102-2, a laptop 102-3, a desktop computer 102-4, a computing watch 102-5, computing spectacles 102-6, a gaming system 102-7, a microwave 102-8, and a vehicle 102-9. The other electronic devices may also include televisions, entertainment systems, audio systems, drones, track pads, drawing pads, netbooks, e-readers, home-automation and control systems, home security systems, and other home appliances. Note that the electronic devices that can implement the described techniques can be wearable, non-wearable but mobile, or relatively immobile (e.g., desktops and appliances).

Exemplary overall lateral dimensions of the smartphone 102 can be, for example, approximately eight centimeters by approximately fifteen centimeters. Exemplary footprints of the radar system 104 can be even more limited, such as approximately four millimeters by six millimeters with antennas included. Exemplary power consumption of the radar system 104 may be on the order of a few milliwatts (mW) to several mW (e.g., between approximately two mW and twenty mW). The requirement of such a limited footprint for the radar system 104, which is needed to accommodate the many other desirable features of the smartphone 102 in such a space-limited package (e.g., a camera, a fingerprint sensor, the display 108, and so forth) combined with power and processing limitations, can lead to compromises in the accuracy and efficacy of radar gesture detection, at least some of which can be overcome in view of the teachings herein.

The smartphone 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some of the functionalities described herein. The smartphone 102 may also include a network interface. The smartphone 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. As noted, constraints or limitations of the smartphone 102 may impact a design of the radar system 104. The smartphone 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 is illustrated as part of the smartphone 102. In other implementations, the radar system 104 may be separate or remote from the smartphone 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 12 illustrate some of many possible environments and devices capable of employing the described techniques. FIGS. 3-6 describe additional details and features of the radar system 104. In FIGS. 3-6, the radar system 104 is described in the context of the smartphone 102, but as noted above, the applicability of the features and advantages of the described systems and techniques are not necessarily so limited, and other embodiments involving other types of electronic devices may also be within the scope of the present teachings.

Figure 3:
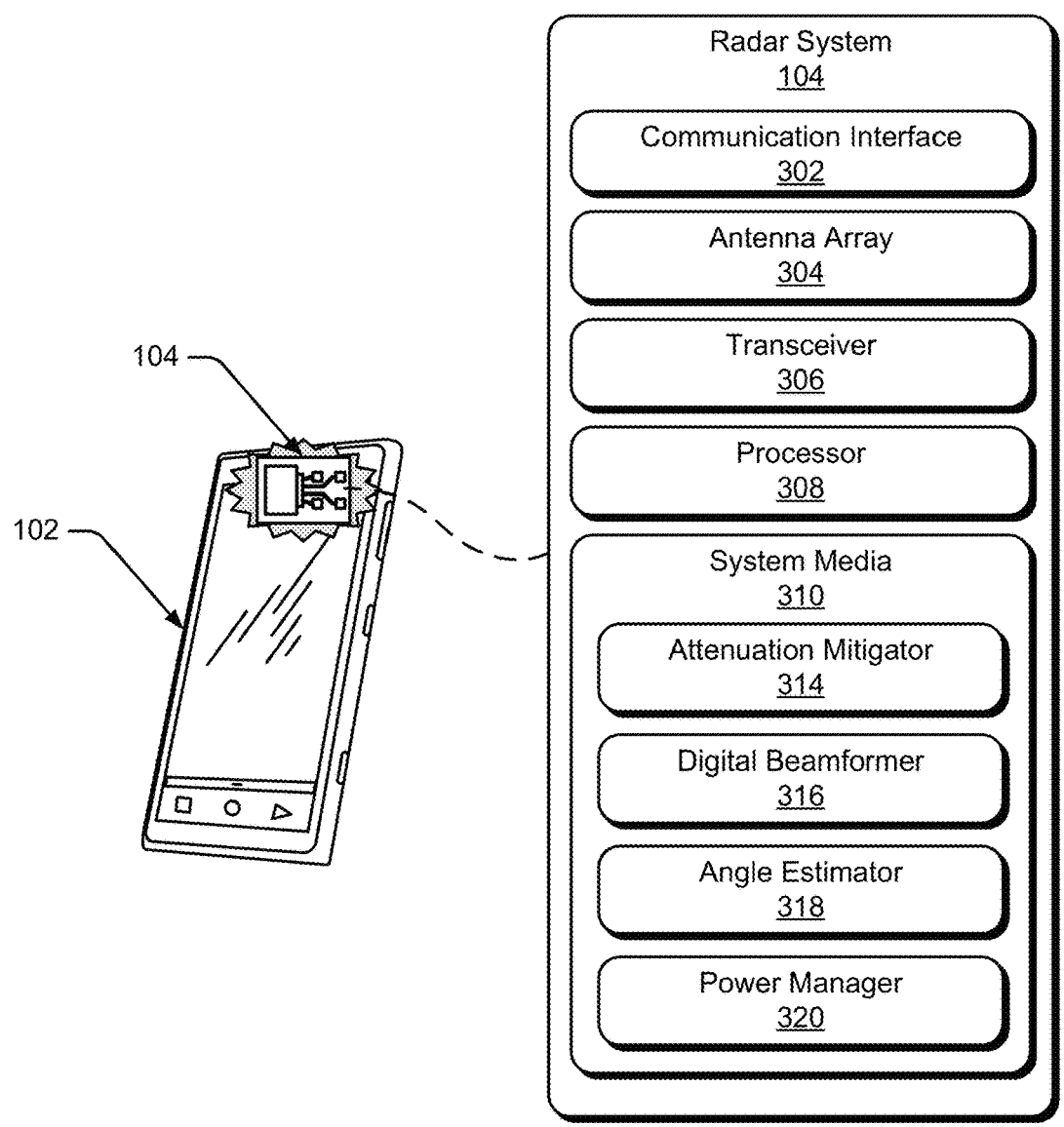
FIG. 3 illustrates an example implementation of the radar system of FIG. 2.

FIG. 3 illustrates an example implementation 300 of the radar system 104 that can be used to enable a radar system facilitating ease and accuracy of user interactions with a user interface. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the smartphone 102) or some combination thereof. The system media 310, which may be included within, or be separate from, the computer-readable media 204 of the smartphone 102, includes one or more of the following modules: an attenuation mitigator 314, a digital beamformer 316, an angle estimator 318, or a power manager 320. These modules can compensate for, or mitigate the effects of, integrating the radar system 104 within the smartphone 102, thereby enabling the radar system 104 to recognize small or complex gestures, distinguish between different orientations of the user, continuously monitor an external environment, or realize a target false alarm rate. With these features, the radar system 104 can be implemented within a variety of different devices, such as the devices illustrated in FIG. 2.

Using the communication interface 302, the radar system 104 can provide radar data to the radar-based application 106. The communication interface 302 may be a wireless or wired interface based on the radar system 104 being implemented separate from, or integrated within, the smartphone 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the radar-based application 106 for implementing a radar system facilitating ease and accuracy of user interactions with a user interface.

Figure 4:
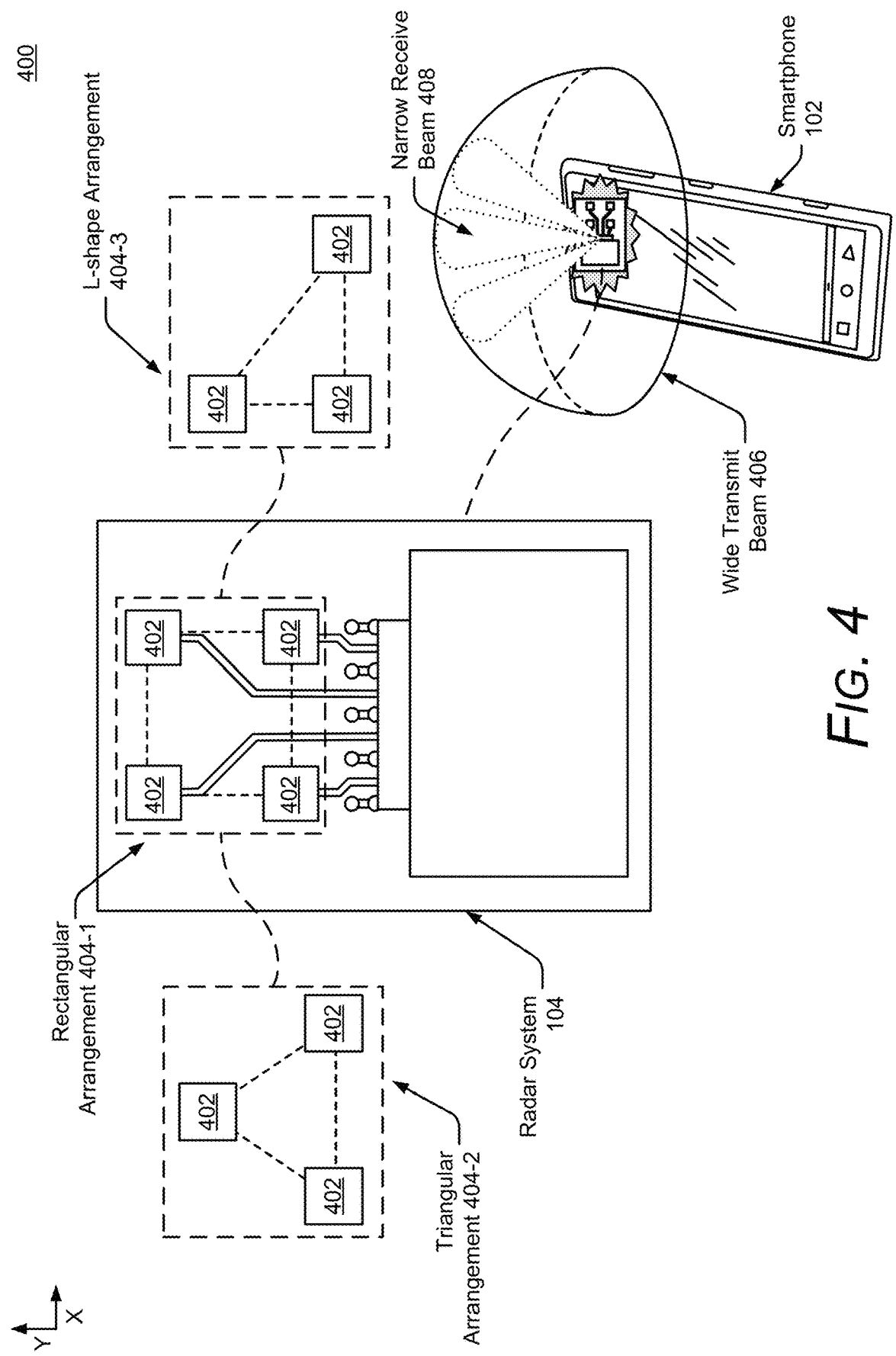
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the smartphone 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

The power manager 320 enables the radar system 104 to conserve power internally or externally within the smartphone 102. Internally, for example, the power manager 320 can cause the radar system 104 to collect data using a predefined power mode or a specific duty cycle. Instead of operating at either a low-power mode or a high-power mode, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the smartphone 102. In some cases, the power manager 320 may monitor an amount of available power remaining and adjust operations of the radar system 104 accordingly. For example, if the remaining amount of power is low, the power manager 320 may continue operating at the low-power mode instead of switching to the higher power mode.

The low-power mode, for example, may use a low duty cycle on the order of a few hertz (e.g., approximately 1 Hz or less than 5 Hz), which reduces power consumption to a few milliwatts (mW) (e.g., between approximately 2 mW and 5 mW). The high-power mode, on the other hand, may use a high duty cycle on the order of tens of hertz (Hz) (e.g., approximately 20 Hz or greater than 10 Hz), which causes the radar system 104 to consume power on the order of several milliwatts (e.g., between approximately 8 mW and 20 mW). While the low-power mode can be used to monitor the external environment or detect an approaching user, the power manager 320 may switch to the high-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the smartphone 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (µs), milliseconds (ms), or seconds (s). Additionally, the power manager 320 can control the use of different hardware components within the radar system 104 to conserve power. If the processor 308 comprises a low-power processor and a high-power processor (e.g., processors with different amounts of memory and computational capability), for example, the power manager 320 can switch between utilizing the low-power processor for low-level analysis (e.g., detecting motion, determining a location of a user, or monitoring the environment) and the high-power processor for situations in which high-fidelity or accurate radar data is requested by the radar-based application 106 (e.g., for gesture recognition or user orientation).

In addition to the internal power-saving techniques described above, the power manager 320 can also conserve power within the smartphone 102 by activating or deactivating other external components or sensors that are within the smartphone 102. These external components may include speakers, a camera sensor, a global positioning system, a wireless communication transceiver, a display, a gyroscope, or an accelerometer. Because the radar system 104 can monitor the environment using a small amount of power, the power manager 320 can appropriately turn these external components on or off based on where the user is located or what the user is doing. In this way, the smartphone 102 can seamlessly respond to the user and conserve power without the use of automatic shut-off timers or the user physically touching or verbally controlling the smartphone 102.

Figure 5:
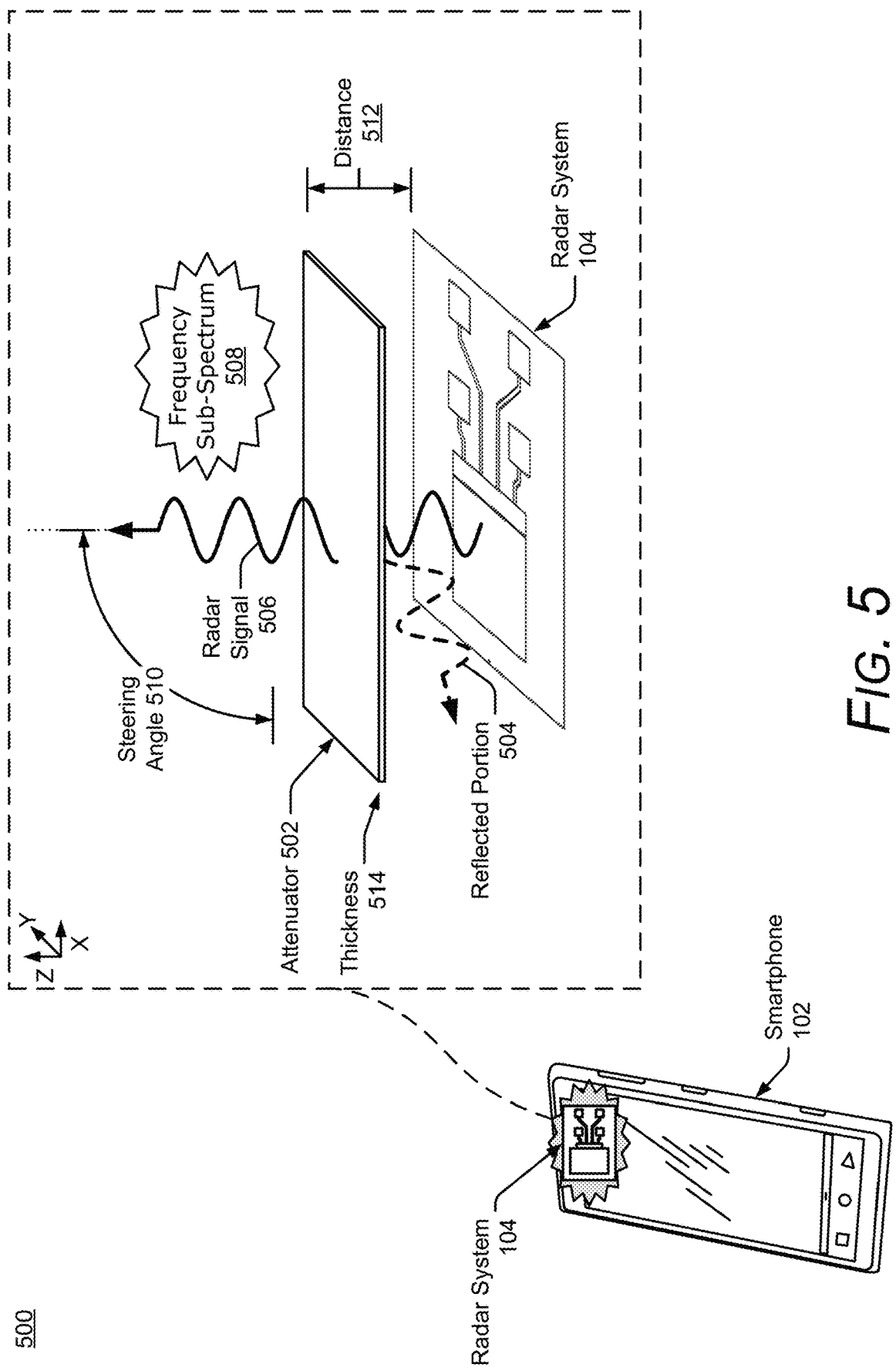
FIG. 5 illustrates additional details of an example implementation of the radar system of FIG. 2.

FIG. 5 illustrates additional details of an example implementation 500 of the radar system 104 within the smartphone 102. In the example 500, the antenna array 304 is positioned underneath an exterior housing of the smartphone 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the smartphone 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the smartphone 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
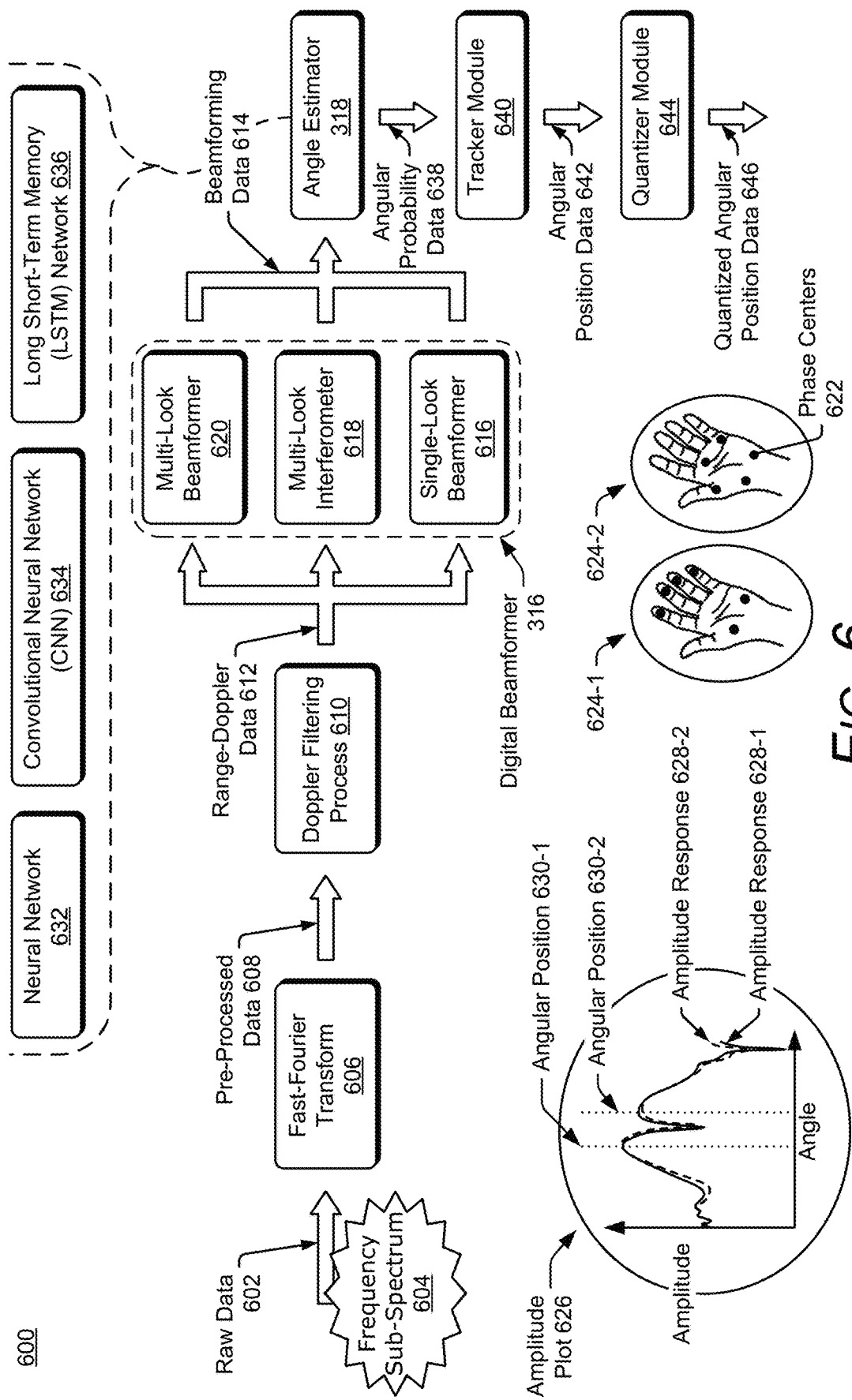
FIG. 6 illustrates an example scheme that can be implemented by the radar system of FIG. 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications 106, and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device (e.g., computational capability or power constraints) or a target angular resolution for the radar-based application 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the smartphone 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the radar-based application 106. In some situations, fewer quantization levels can be used such that the quantized angular position data 646 indicates whether the target is to the right or to the left of the smartphone 102 or identifies a 90-degree quadrant the target is located within. This may be sufficient for some radar-based applications 106, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications 106, such as gesture recognition. In some implementations, the digital beamformer 316, the angle estimator 318, the tracker module 640, and the quantizer module 644 are together implemented in a single machine learning module.

These and other capabilities and configurations, as well as ways in which entities of FIGS. 1-6 act and interact, are set forth below. The described entities may be further divided, combined, used along with other sensors or components, and so on. In this way, different implementations of the electronic device (e.g., the smartphone 102), with different configurations of the radar system 104 and non-radar sensors, can be used to implement a radar system facilitating ease and accuracy of user interactions with a user interface.

The example operating environment 100 of FIG. 1 and the detailed illustrations of FIGS. 2-6 illustrate but some of many possible environments and devices capable of employing the described techniques.

Example Systems

As noted above, the techniques and systems described herein can also enable the device to determine three-dimensional (3D) gestures that can be used to implement one or more mixed-controls features (e.g., a touch or voice input in combination with 3D gestures) to interact with non-AR applications and programs.

Figure 7:
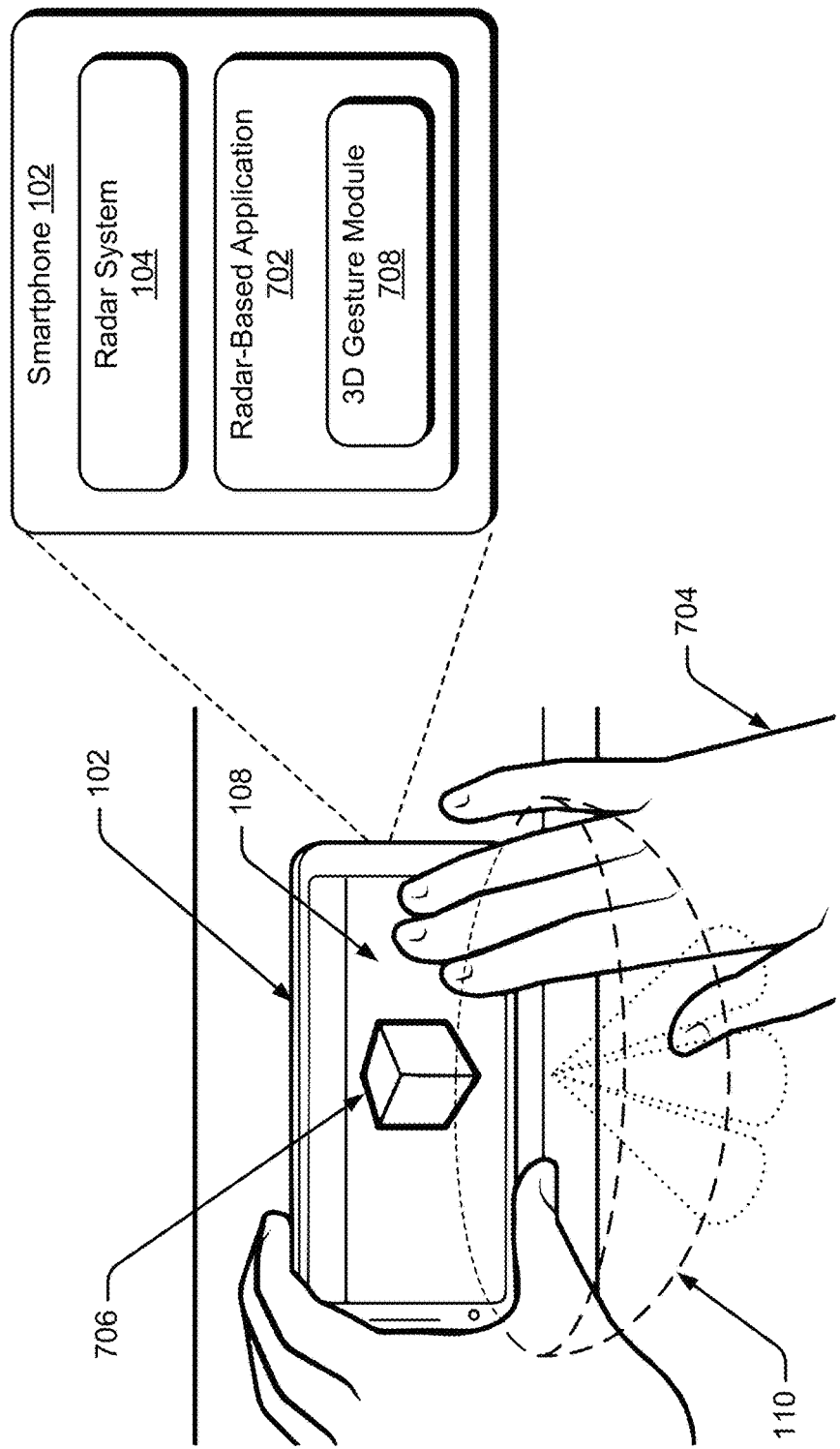
FIG. 7 illustrates another example environment in which techniques enabling a radar system facilitating ease and accuracy of user interactions with a user interface can be implemented.

FIG. 7 illustrates another example environment 700 in which techniques enabling a radar system facilitating ease and accuracy of user interactions with a user interface can be implemented. The example operating environment 700 includes the smartphone 102, which includes, or is associated with, the radar system 104, the display 108, and a radar-based application 702. While the example operating environment 700 is illustrated in the context of the smartphone 102, other electronic devices, as described above with reference to FIGS. 1 and 2, may also be used to implement the features and techniques described with reference to FIGS. 7-9. In the example environment 700, the radar system 104 provides the radar field 110 as described above with reference to FIGS. 1-6. The radar system 104 also enables the smartphone 102 to sense and analyze reflections from an object 704 in the radar field 110. As shown in FIG. 7, the object 704 is a human hand, but the object 704 may be any of a variety of objects that the radar system 104 can sense and analyze reflections from, such as wood, plastic, metal, fabric, or organic material (e.g., a body part of a user). Based on the analysis of the reflections, the radar system 104 can provide radar data as described above with reference to FIGS. 1-6. For example, the radar system 104 can pass the radar data to other entities, such as the radar-based application 702.

The radar-based application 702 may be any of a variety of AR-capable applications (e.g., the radar-based application 106) that can present an AR element 706 through the display 108 and receive an input selecting the AR element 706. The input received for selecting the AR element 706 may be a voice input or a touch input received through a touchscreen of the smartphone 102. Further, the radar-based application 702 can determine, based on the radar data, a gesture made by the object 704 in the radar field 110 (e.g., the user's hand or other body part) and perform an action related to the selected AR element 706 that corresponds to the determined gesture. The radar data used to determine the gesture is radar data based on an analysis of reflections received after the input selecting the AR element 706 has been received by the radar-based application 702). In some implementations, the determined gesture may be a 3D gesture (e.g., a gesture that comprises one or more movements, in any direction, within a 3D space illuminated by the radar field 110).

A 3D gesture can be any of a variety of gestures, including a scrolling gesture made by moving a hand above the smartphone 102 along a horizontal dimension (e.g., from a left side of the smartphone 102 to a right side of the smartphone 102), a waving gesture made by the user's arm rotating about an elbow, a pushing gesture made by moving the user's hand above the smartphone 102 along a vertical dimension (e.g., from a bottom side of the smartphone 102 to a top side of the smartphone 102). Other types of 3D gestures or motions may also be made, such as a reaching gesture made by moving the user's hand towards the smartphone 102, a knob-turning gesture made by curling fingers of the user's hand to grip an imaginary door knob and rotating in a clockwise or counter-clockwise fashion to mimic an action of turning the imaginary door knob, and a spindle-twisting gesture made by rubbing a thumb and at least one other finger together. Each of these example gesture types may be detected by the radar system 104. Upon detecting each of these gestures, the smartphone 102 may perform an action, such as display new content, move a cursor, activate one or more sensors, open an application, or manipulate an AR element. In this way, the radar system 104 provides touch-free control of the smartphone 102. Exemplary 3D gestures and corresponding actions are described below with reference to FIGS. 8 and 9.

The radar-based application 702 may also include a 3D gesture module 708, which can store information related to determining 3D gestures based on the radar data and information related to actions that correspond to the 3D gestures. In this way, the described apparatuses and techniques may enable users of AR applications to seamlessly and conveniently use both touch inputs and 3D gestures in an AR environment.

Figure 8:
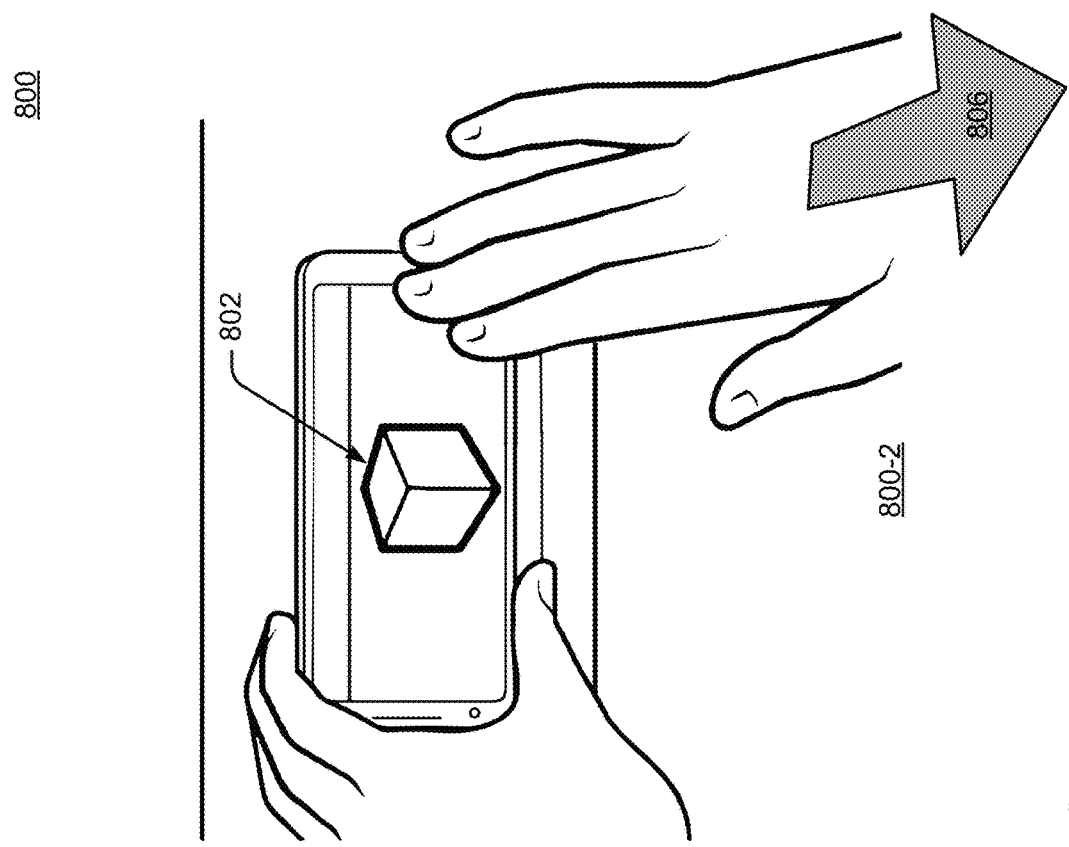
FIG. 8 illustrates an example implementation of the radar system of FIG. 7, which describes additional details regarding the capabilities of the radar system to use three-dimensional (3D) gestures to enable a radar system facilitating ease and accuracy of user interactions with a user interface.
Figure 8:
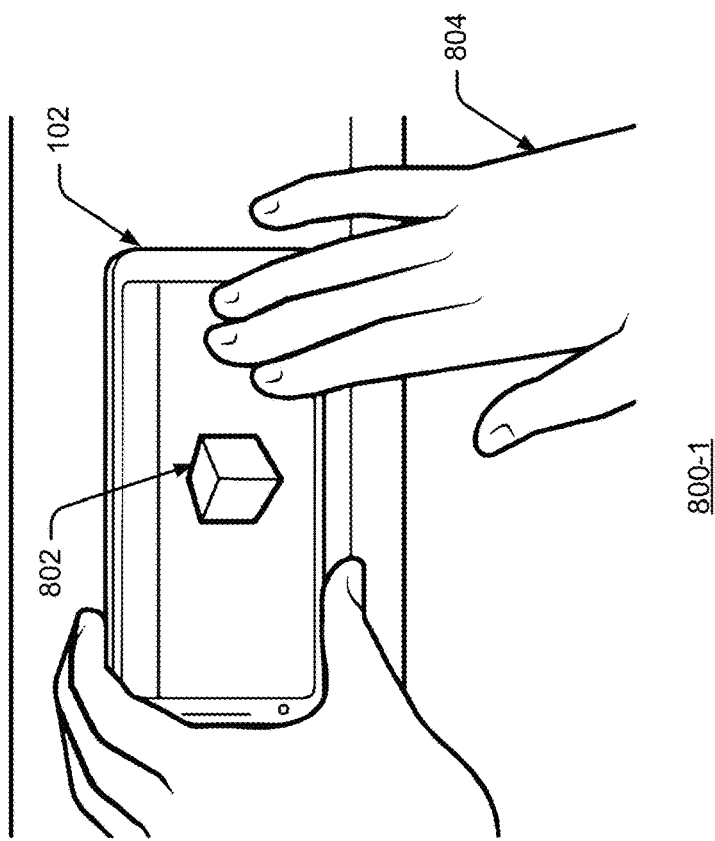
Figure 9:
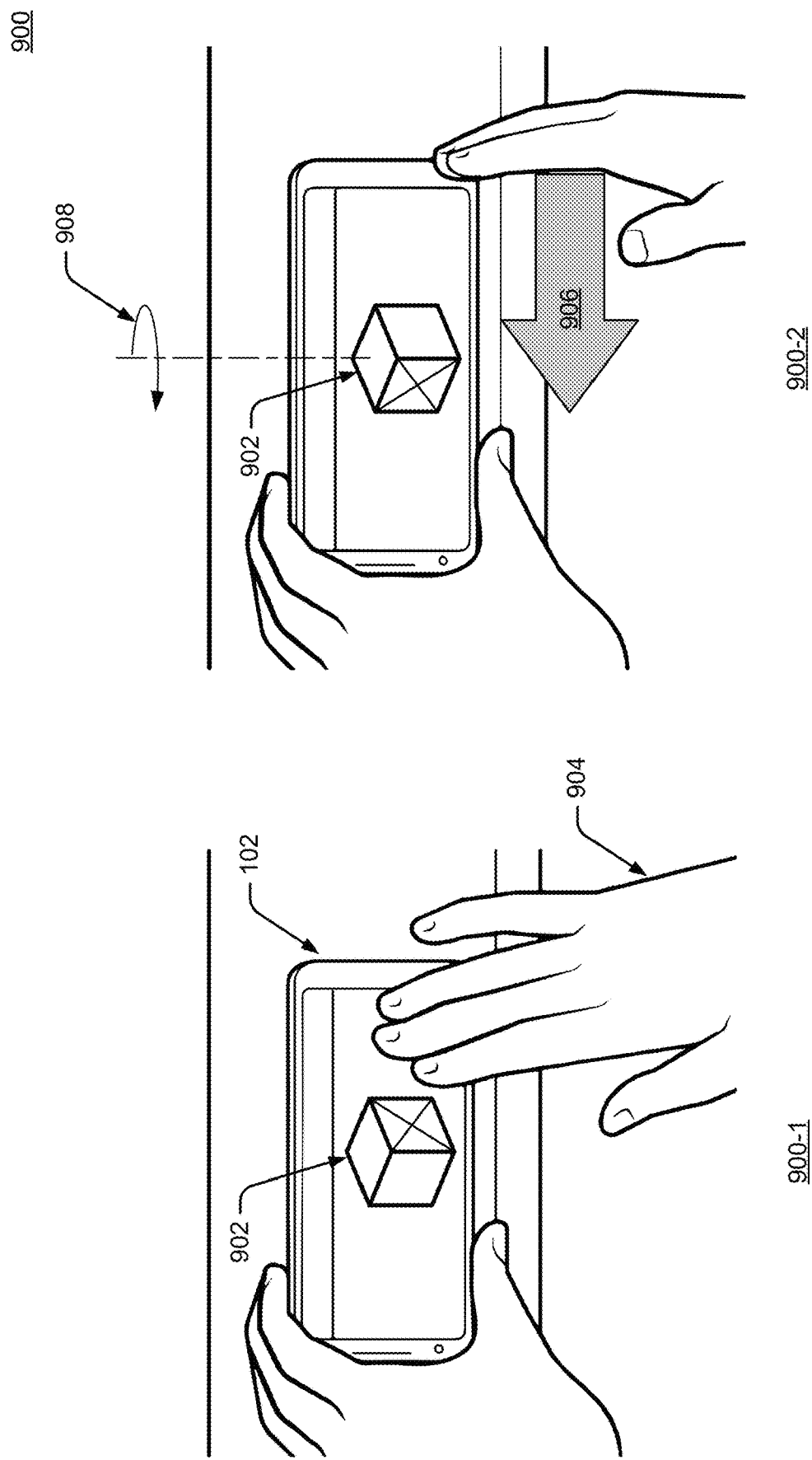
FIG. 9 illustrates another example implementation of the radar system of FIG. 7, which describes more details regarding the capabilities of the radar system to use 3D gestures to enable a radar system facilitating ease and accuracy of user interactions with a user interface.

By way of further example, consider FIGS. 8 and 9, which illustrate example implementations 800 and 900, respectively. The example implementations 800 and 900 describe additional details regarding the capabilities of the radar system 104 to use 3D gestures to enable a radar system facilitating ease and accuracy of user interactions with a user interface.

In a detail view 800-1 of FIG. 8, the example environment 800 illustrates the smartphone 102, including the radar system 104, which is providing the radar field 110 (not shown). In the detail view 800-1, assume a user has already selected an AR element 802, for example by selecting the AR element 802 via a touch input. A user's body part 804 (in this case the user's hand 804) is in the radar field 110, and the radar system 104 can determine a 3D gesture made by the user's hand 804.

In a detail view 800-2, the user has made a gesture by changing a distance between the user's hand 804 and the radar system 104 (e.g., a reaching gesture). In the detail view 800-2, the distance is changed by moving the user's hand 804 to increase the distance between the user's hand 804 and the radar system 104, as shown by arrow 806. The action corresponding to this gesture is a movement of the selected AR element 802 closer to the user, illustrated in the detail view 800-2 as an increased size of the selected AR element 802. Similarly, though not shown in FIG. 8, the user may make a gesture by moving the user's hand 804 to decrease the distance between the user's hand 804 and the radar system 104. In such a case, the action corresponding to this gesture is a movement of the selected AR element 802 away from the user.

In some implementations, the movement of the selected AR element 802 closer to the user is proportional to the increased distance between the user's hand 804 and the radar system 104. Similarly, the movement of the selected AR element 802 away from the user is proportional to the decreased distance between the user's hand 804 and the radar system 104. In other implementations, the movement of the selected AR element 802 may be proportional to other aspects of the gesture that can be determined from the radar data, such as a velocity or an angle, or to a combination of various aspects of the gesture.

In a detail view 900-1 of FIG. 9, the example environment 900 illustrates the smartphone 102, including the radar system 104, which is providing the radar field 110 (not shown). In the detail view 900-1, assume a user has already selected an AR element 902, for example by selecting the AR element 902 via a touch input. A user's body part 904 (in this case the user's hand 904) is in the radar field 110, and the radar system 104 can determine a 3D gesture made by the user's hand 904.

In a detail view 900-2, the user has made a gesture by changing a position of the user's hand 904, relative to the radar system 104, while maintaining a substantially similar distance between the user's hand 904 and a reference, such as a plane of the display 108 (e.g., a scrolling gesture). In the detail view 900-2, the changed position of the user's hand 904 is a motion from right to left, as shown by an arrow 906. The action corresponding to this gesture is a rotation of the selected AR element 902 in a direction about an axis of the selected AR element 902 as shown by arrow 908 and the illustration of the marked side of the AR element 902 (marked with an "X") rotating approximately 90 degrees. Similarly, though not shown in FIG. 9, the user may make a gesture by moving the user's hand 904 from left to right. In such a case, the action corresponding this gesture is a rotation of the selected AR element 902 in an opposite direction about the axis.

In some implementations, a velocity and amount of the rotation of the selected AR element 902 around the axis is proportional to the velocity or distance, respectively, of the side-to-side motion of the user's hand 904. In other implementations, the rotation of the AR element 902 may be proportional to other aspects of the gesture that can be determined from the radar data, such as a shape or surface area of the user's hand 904, or to a combination of various aspects of the gesture.

It should be noted that the example implementations 800 and 900 are merely two examples out of many possible gestures that are possible using the described techniques, systems, and apparatuses that enable a radar system facilitating ease and accuracy of user interactions with a user interface. For example, a user may use a touch input to select a 3D object in an AR environment, then use a 3D pinch gestures to make the 3D object smaller or even delete the object. Similarly, user may use a flicking motion to throw a selected 3D object in the AR environment.

Further, the described techniques can also be used in conjunction with other types of applications (e.g., non-AR) or with non-AR features of AR applications. For example, a user may use mixed controls (e.g., a touch or voice input in combination with 3D gestures) to interact with drawing- or text-based applications and features. In one example, a user may draw a line in an application by touching a finger to the touchscreen of a device and then sliding the finger along the touchscreen. Then, the user can lift the finger off of the touchscreen and use a 3D gesture, such as turning a virtual dial, to change a thickness or other property of the line. In another example, a user may select, copy, and paste text on a touchscreen. For instance, the user can perform a touch-and-pinch gesture on the touchscreen to select a portion of displayed text. The user can than perform a 3D pinch gesture to copy the text and, switching back to a touch input, position the cursor on the touchscreen. Another 3D pinch gesture pastes the selected text in the new location. In this way, a radar system facilitating ease and accuracy of user interactions with a user interface enables seamless integration of touch and 3D gestures to improve functionality and user enjoyment of both AR and non-AR applications.

Example Methods

Figure 10:
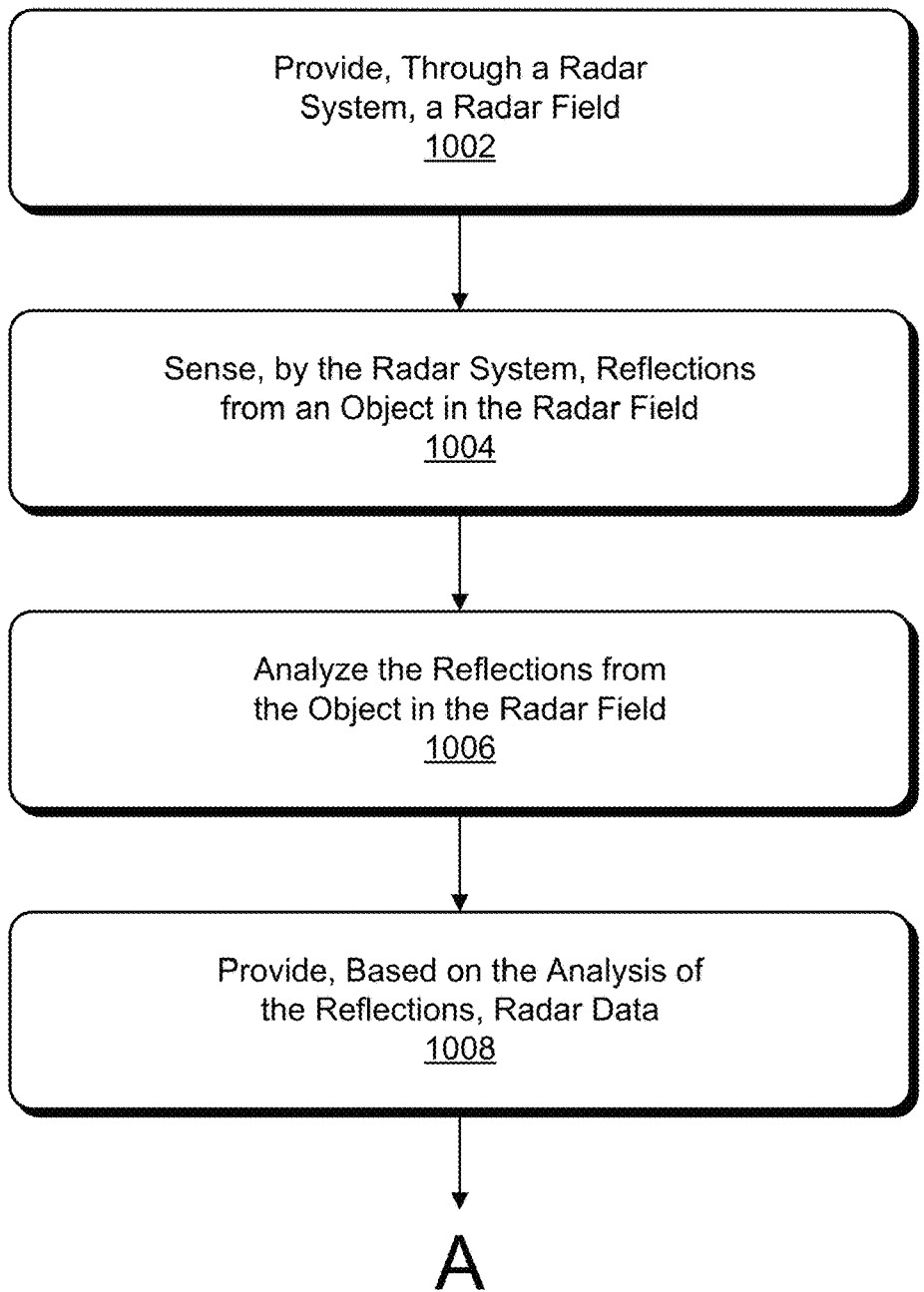
FIGS. 10 and 11 depict an example method enabling a radar system facilitating ease and accuracy of user interactions with a user interface.
Figure 11:
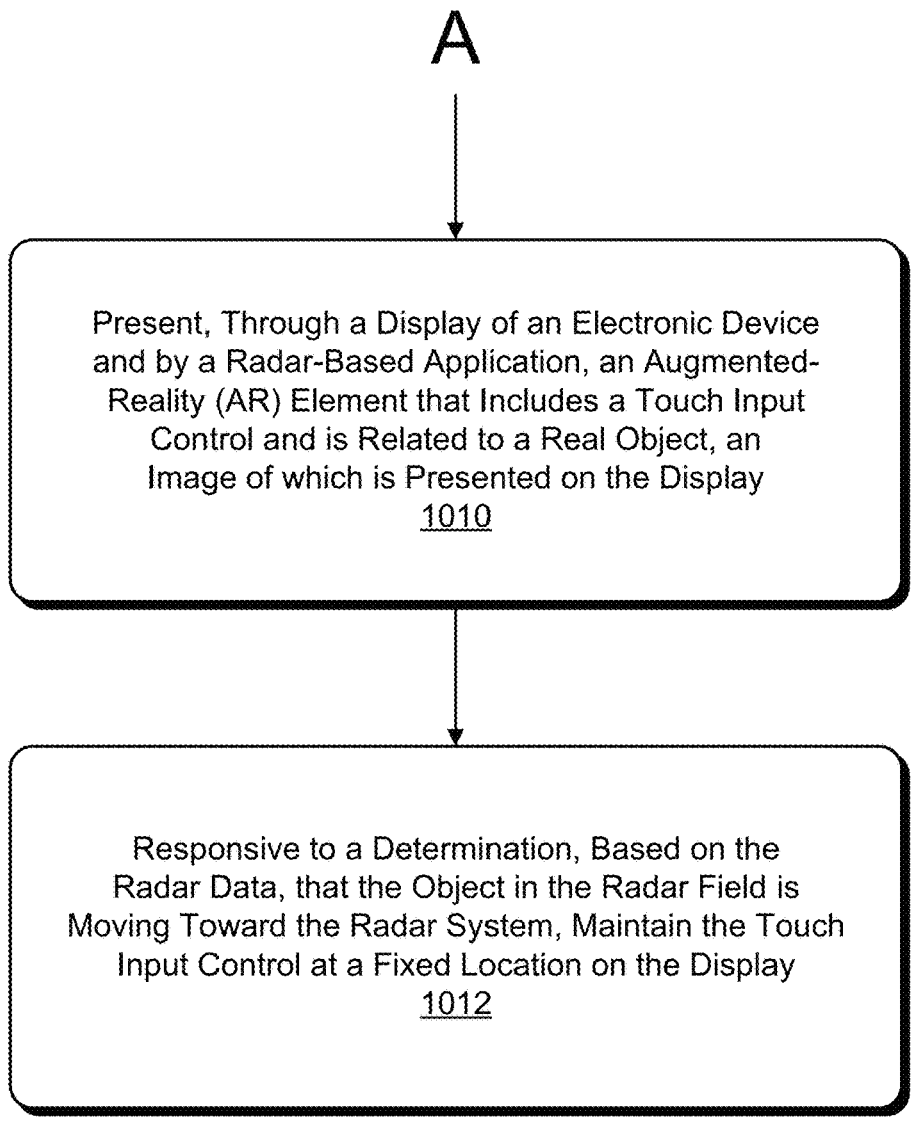

FIGS. 10 and 11 depict an example method 1000 enabling a radar system facilitating ease and accuracy of user interactions with a user interface. The method 1000 can be performed with an electronic device that uses a radar system to provide a radar field. The radar field is used to determine that an object in the radar field is moving toward the radar system and can fix the location of various touch input controls to a particular location in response to the determination the object is moving toward the radar system. The method 1000 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-9, reference to which is made for example only. The techniques are not limited to performance by one entity or multiple entities operating on one device.

At 1002, a radar field is provided. This radar field can be provided by any of a variety of electronic devices (e.g., the smartphone 102 described above), that include a display (e.g., the display 108), a radar system (e.g., the radar system 104), and a radar-based application (e.g., the radar-based applications 106 or 702). Further, the radar field may be any of a variety of types of radar fields, such as the radar field 110 described above.

At 1004, reflections from an object in the radar field are sensed by the radar system. The object may be any of a variety of objects, such as wood, plastic, metal, fabric, or organic material. For example, the object may be a human body part (e.g., a hand), such as one of the objects 112, 704, 804, or 904 as described above.

At 1006, the reflections from the object in the radar field are analyzed. The analysis may be performed by any of a variety of entities (e.g., the radar system 104 or any of the radar-based applications described herein) and may include various operations or determinations, such as those described with reference to FIGS. 3-6.

At 1008, based on the analysis of the reflection, radar data, such as the radar data described above with reference to FIGS. 3-6 is provided. The radar data may be provided by any of a variety of entities, such as the radar system 104 or any of the radar-based applications described herein. In some implementations, the radar system may provide the radar data and pass the radar data to other entities (e.g., any of the described radar-based applications). The description of the method 1000 continues in FIG. 11, as indicated by the letter "A" after block 1008 of FIG. 10, which corresponds to the letter "A" before block 1010 of FIG. 11.

At 1010, the radar-based application presents an augmented-reality (AR) element through the display (e.g., the display 108). The AR element maybe any of a variety of types of AR elements, such as the AR element 116 described above. The AR element includes a touch input control, such as the touch input control 118 described above, and is related to a real object (e.g., the real object 120-1 described above), an image of which is presented on the display.

At 1012, in response to a determination that the object in the radar field is moving toward the radar system, the touch input control is provided and maintained at a fixed location on the touchscreen of the electronic device. The fixed location may be a location at which the touch input control is initially displayed, or another location on the display. The determination that the object in the radar field is moving toward the radar system may be made by any of a variety of entities, such as the radar system or the radar-based application.

In some implementations, the touch input control is maintained at the fixed location when the image of the real object is no longer presented on the display. For example, assume that the touch input control is presented with the AR element in a particular corner of the display while the related real object is visible in the display of the electronic device and the user is reaching toward the display. If for some reason the image of the real object stops being presented on the display (e.g., because the user did not keep the real object framed while reaching for the touch input control), the touch input control may continue to be maintained in the particular corner of the display (or at another location), so that the user can interact with the touch input control.

Figure 12:
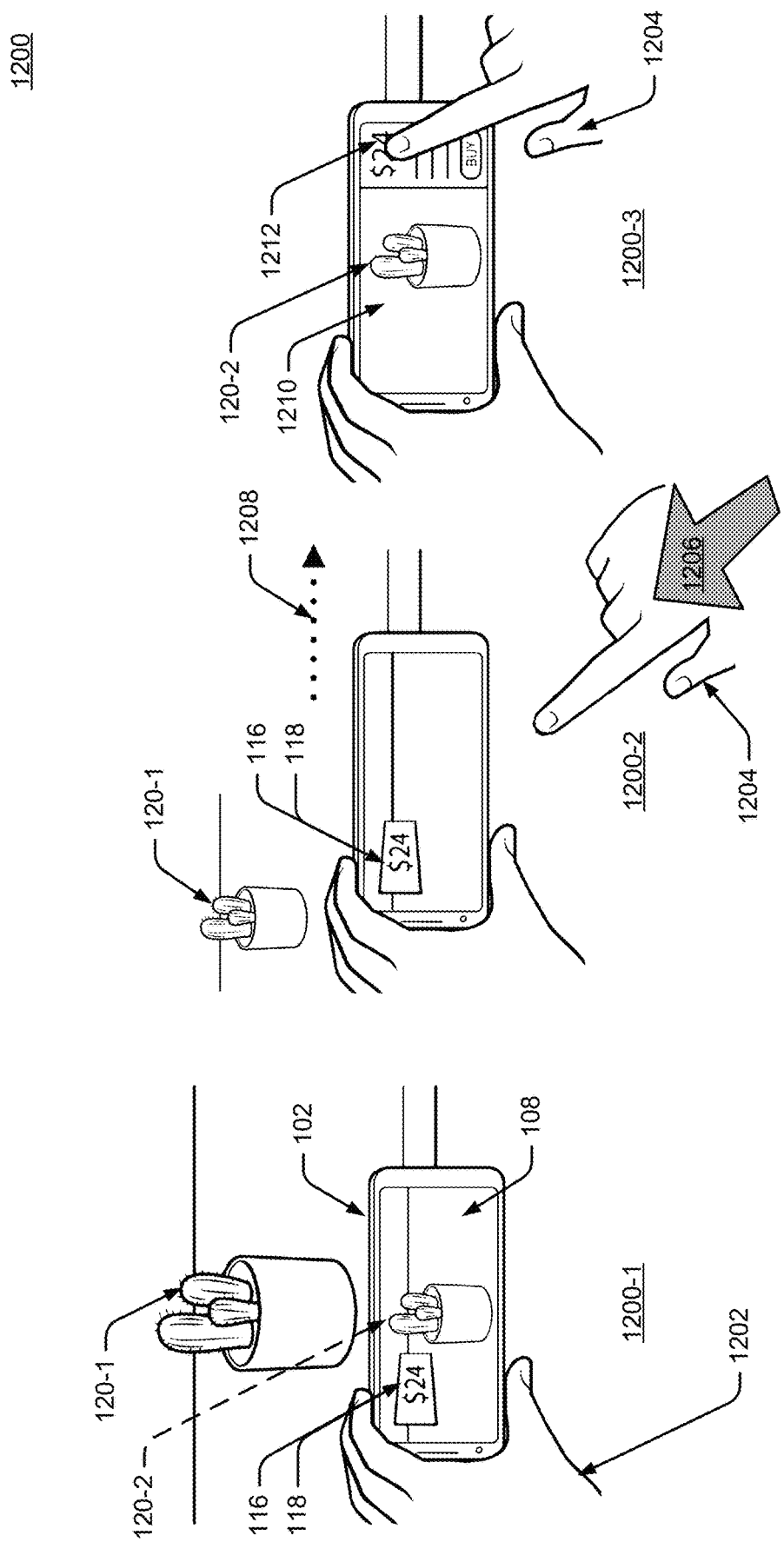
FIG. 12 illustrates additional details of the method of FIGS. 10 and 11.

Consider, for example, FIG. 12, which illustrates an example environment 1200 that describes additional details of the method 1000. In a detail view 1200-1 of FIG. 12, the example environment 1200 illustrates the electronic device (in this case, the smartphone 102), including the radar system 104, which is providing the radar field 110 (not shown). The detail view 1200-1 shows that a user, holding the smartphone in one hand (e.g., a left hand 1202) has framed the real object 120-1 in an AR interface of the radar-based application 106 running on the smartphone 102-1. As shown, the radar-based application 106 is presenting an image (e.g., the image 120-2) of the real object 120-1 on the display 108 (the image 120-2 is shown with a dashed-line arrow). The radar-based application 106 is also presenting the AR element 116, including the touch input control 118, at location near a corner of the display 108.

In a detail view 1200-2, the user has started reaching toward the touch input control 118 with another hand (e.g., a right hand 1204), as shown by a shaded arrow 1206. Assume that it has been determined that the user is reaching toward the smartphone 102 (e.g., the radar-based application 106, or another entity, has used the radar data to determine that the right hand 1204 is reaching toward the smartphone 102). While reaching for the touch input control 118 with the right hand 1204, the user has also moved the smartphone 102 such that the image 120-2 of the real object 120-1 is no longer visible through the display 108. The movement is illustrated by a dotted-line arrow 1208. Using the described techniques, the radar-based application 106 is still maintaining the AR element 116 and the touch input control 118 at approximately the same location, near the corner of the display 108.

In a detail view 1200-3, assume that the user has activated the touch input control 118 (e.g., via a touch input with the right hand 1204). In response, the radar-based application 106 is presenting a 2D interface 1210 that shows another image 120-2 of the real object 120-1 (not shown), along with additional touch input controls 1212 that can provide the user with information about the real object 120-1.

In some implementations, if the touch input control 118 being provided at the fixed location is not touched within a threshold time from the determination that the object in the radar field is moving toward the display 108, the touch input control may cease to be provided at the fixed location. The threshold time may be a variety of times, such as 1.5 seconds (s), 2 s, or 3 s, and may be preset, or user-selectable. In still other implementations, the radar-based application 106 may provide the touch input control at fixed location only if it is determined that the user's hand is moving toward the display 108 at a velocity that exceeds a threshold velocity. The threshold velocity may be any appropriate velocity, such as 0.25 feet/second (fps), 0.5 fps, or 0.75 fps.

Example Computing System

Figure 13:
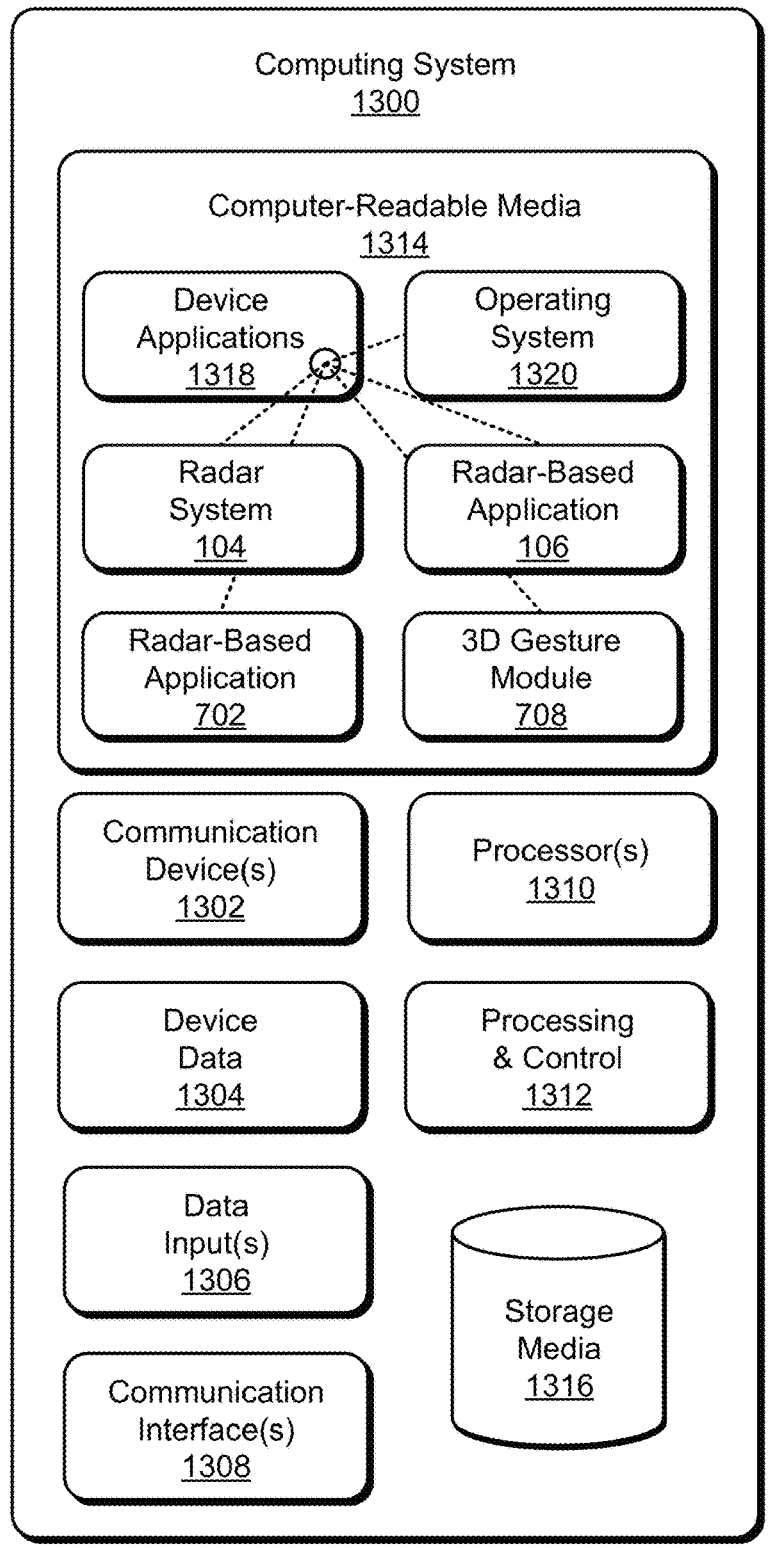
FIG. 13 illustrates an example computing system that can implement, or in which techniques may be implemented that enable, a radar system facilitating ease and accuracy of user interactions with a user interface.

FIG. 13 illustrates various components of an example computing system 1300 that can be implemented as any type of client, server, and/or electronic device as described with reference to the previous FIGS. 1-12 to implement a radar system facilitating ease and accuracy of user interactions with a user interface.

The computing system 1300 includes communication devices 1302 that enable wired and/or wireless communication of device data 1304 (e.g., radar data, 3D gesture data, authentication data, reference data, received data, data that is being received, data scheduled for broadcast, data packets of the data). The device data 1304 or other device content can include configuration settings of the device, media content stored on the device, and/or information associated with a user of the device (e.g., an identity of a person within a radar field). Media content stored on the computing system 1300 can include any type of radar, biometric, audio, video, and/or image data. The computing system 1300 includes one or more data inputs 1306 via which any type of data, media content, and/or inputs can be received, such as human utterances, interactions with a radar field, touch inputs, user-selectable inputs (explicit or implicit), messages, music, television media content, recorded video content, and any other type of audio, video, and/or image data received from any content and/or data source.

The computing system 1300 also includes communication interfaces 1308, which can be implemented as any one or more of a serial and/or parallel interface, a wireless interface, any type of network interface, a modem, and as any other type of communication interface. The communication interfaces 1308 provide a connection and/or communication links between the computing system 1300 and a communication network by which other electronic, computing, and communication devices communicate data with the computing system 1300.

The computing system 1300 includes one or more processors 1310 (e.g., any of microprocessors, controllers, or other controllers) that can process various computer-executable instructions to control the operation of the computing system 1300 and to enable techniques for, or in which can be implemented, a radar system facilitating ease and accuracy of user interactions with a user interface. Alternatively or additionally, the computing system 1300 can be implemented with any one or combination of hardware, firmware, or fixed logic circuitry that is implemented in connection with processing and control circuits, which are generally identified at 1312. Although not shown, the computing system 1300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1300 also includes computer-readable media 1314, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1300 can also include a mass storage media device (storage media) 1316.

The computer-readable media 1314 provides data storage mechanisms to store the device data 1304, as well as various device applications 1318 and any other types of information and/or data related to operational aspects of the computing system 1300. For example, an operating system 1320 can be maintained as a computer application with the computer-readable media 1314 and executed on the processors 1310. The device applications 1318 may include a device manager, such as any form of a control application, software application, signal-processing and control modules, code that is native to a particular device, an abstraction module, a gesture recognition module, and other modules. The device applications 1318 may also include system components, engines, or managers to implement a radar system facilitating ease and accuracy of user interactions with a user interface, such as the radar system 104, the radar-based application 106, or the radar-based application 702 (including the 3D gesture module 708). The computing system 1300 may also include, or have access to, one or more machine learning systems.

CONCLUSION

Although implementations of techniques for, and apparatuses enabling, a radar system facilitating ease and accuracy of user interactions with a user interface have been described in language specific to features and/or methods, it is to be understood that the subject of the appended claims is not necessarily limited to the specific features or methods described. Rather, the specific features and methods are disclosed as example implementations enabling the radar system facilitating ease and accuracy of user interactions with a user interface.

What is claimed is:

1. An electronic device, comprising:
   a display;
   a radar system, implemented at least partially in hardware, configured to:
      provide a radar field;
      sense reflections from an object in the radar field;
      analyze the reflections from the object in the radar field; and
      provide, based on the analysis of the reflections, radar data; and
   one or more computer processors that cause the electronic device to:
      present a user interface through the display of the electronic device, the user interface capable of receiving a touch input;
      receive a touch input through the user interface;
      perform an action that corresponds to the touch input, the action causing a result;
      determine, based on the radar data, a gesture by the object in the radar field; and
      perform another action that corresponds to the determined gesture, the other action associated with the result of the action corresponding to the touch input.

2. The electronic device of claim 1, wherein the object in the radar field comprises a user.

3. The electronic device of claim 2, wherein:
   the action that corresponds to the touch input comprises an action by a drawing-based application; and
   the other action that corresponds to the determined gesture is related to the drawing-based application.

4. The electronic device of claim 3, wherein the drawing-based application comprises one of:
   a graphical design application;
   a sketching application; or
   a computer-aided drafting program.

5. The electronic device of claim 3, wherein the other action that corresponds to the determined gesture and is related to the drawing-based application comprises one or more of:
   creation of a new element of a drawing produced with the drawing-based application;
   a change to an existing element of the drawing produced with the drawing-based application;
   an operation performed on a data file that represents the drawing produced with the drawing-based application; or
   an interaction with a menu of the drawing-based application.

6. The electronic device of claim 2, wherein:
   the touch input comprises a touch and a slide of a finger along the user interface;
   the result of the action that corresponds to the touch input comprises displaying a line on the display, the line having a shape that corresponds to a shape of the slide; and
   the other action that corresponds to the determined gesture comprises a change to the line, the change including at least one of:
      increasing or decreasing a thickness of the line;
      changing a color of the line;
      increasing or decreasing a length of the line; or
      changing a pattern of the line.

7. The electronic device of claim 2, wherein the determined gesture comprises a three-dimensional (3D) gesture comprising:
   a dial-turning gesture; or
   a spindle-twisting gesture.

8. The electronic device of claim 2, wherein:
   the action that corresponds to the touch input comprises an action by a text-based application; and
   the other action that corresponds to the determined gesture is related to the text-based application.

9. The electronic device of claim 8, wherein the text-based application comprises one of:
   a word-processing application;
   an e-mail application; or
   a spreadsheet application.

10. The electronic device of claim 8, wherein the other action that corresponds to the determined gesture comprises one or more of:
   a change to existing text in the text-based application;
   creation of new text in the text-based application;
   an operation performed on a data file that represents the text in the text-based application; or
   an interaction with a menu of the text-based application.

11. The electronic device of claim 2, wherein:
   the touch input comprises a touch of two or more fingers of the user to the user interface near a portion of displayed text and then a slide of one or more of the fingers effective to separate the fingers while maintaining the touch to the user interface;
   the result of the action that corresponds to the touch input comprises selecting the portion of displayed text over which the touch input is performed; and
   the determined gesture comprises a three-dimensional (3D) gesture that performs an operation on the selected text.

12. The electronic device of claim 11, wherein:
   the 3D gesture comprises a first pinch gesture;
   the operation performed on the selected text comprises copying the selected text; and
   the instructions are further configured to:
      receive another touch input through the user interface, the other touch input effective to place a cursor on the user interface at a location corresponding to the other touch input;
      determine, based on the radar data, another gesture by the user, the other gesture comprising a second pinch gesture; and
      responsive to determining the second pinch gesture, perform another operation on the selected text, the other operation comprising pasting the selected text at the location corresponding to the other touch input.

13. The electronic device of claim 1, wherein the electronic device comprises a smartphone.

14. The electronic device of claim 1, wherein the electronic device comprises at least one of:
   a tablet computer;
   a laptop computer;
   a desktop computer;
   a computing watch;
   computing spectacles;
   a gaming system;
   a home appliance;
   a vehicle;
   a television;
   an entertainment system;
   a home-automation and control system; or
   a home security system.

15. An electronic device, comprising:
   a display;
   a radar system, implemented at least partially in hardware, configured to:
      provide a radar field;
      sense reflections from an object in the radar field;
      analyze the reflections from the object in the radar field; and
      provide, based on the analysis of the reflections, radar data;
   one or more computer processors; and
   one or more computer-readable media having instructions stored thereon that, responsive to execution by the one or more computer processors, are configured to:
      present a user interface through the display of the electronic device;
      receive a voice input through a microphone of the electronic device;
      perform an action that corresponds to the voice input, the action causing a result;
      determine, based on the radar data, a gesture by the object in the radar field; and
      perform another action that corresponds to the determined gesture, the other action associated with the result of the action corresponding to the voice input.

16. The electronic device of claim 15, wherein the object in the radar field comprises a user.

17. The electronic device of claim 16, wherein:
   the action that corresponds to the voice input comprises an action by a drawing-based application; and
   the other action that corresponds to the determined gesture is related to the drawing-based application.

18. The electronic device of claim 17, wherein the drawing-based application comprises one of:

a graphical design application;
a sketching application; or
a computer-aided drafting program.

19. The electronic device of claim 17, wherein the other action that corresponds to the determined gesture comprises one or more of:
   creation of a new element of a drawing produced with the drawing-based application;
   a change to an existing element of the drawing produced with the drawing-based application;
   an operation performed on a data file that represents the drawing produced with the drawing-based application; or
   an interaction with a menu of the drawing-based application.

20. The electronic device of claim 16, wherein:
   the voice input comprises a first voice-command comprising instructions that describe a line to be displayed on the user interface;
   the result of the action that corresponds to the voice input comprises displaying the line on the display, the line having a shape that corresponds to a shape described by the first voice command; and
   the other action that corresponds to the determined gesture comprises a change to the line, the change including at least one of:
      increasing or decreasing a thickness of the line;
      changing a color of the line;
      increasing or decreasing a length of the line; or
      changing a pattern of the line.

21. The electronic device of claim 16, wherein the determined gesture comprises a three-dimensional (3D) gesture comprising:
   a dial-turning gesture; or
   a spindle-twisting gesture.

22. The electronic device of claim 16, wherein:
   the action that corresponds to the voice input comprises an action by a text-based application; and
   the other action that corresponds to the determined gesture is related to the text-based application.

23. The electronic device of claim 22, wherein the text-based application comprises one of:
   a word-processing application;
   an e-mail application; or
   a spreadsheet application.

24. The electronic device of claim 22, wherein the other action that corresponds to the determined gesture and is related to the text-based application comprises one or more of:
   a change to existing text in the text-based application;
   creation of new text in the text-based application;
   an operation performed on a data file that represents the text in the text-based application; or
   an interaction with a menu of the text-based application.

25. The electronic device of claim 16, wherein:
   the voice input comprises a second voice-command comprising instructions that describe a portion of text displayed on the user interface;
   the result of the action that corresponds to the voice input comprises selecting the portion of displayed text described by the second voice command; and
   the determined gesture comprises a three-dimensional (3D) gesture that performs an operation on the selected text.

26. The electronic device of claim 25, wherein:
   the 3D gesture comprises a first pinch gesture effective to copy the selected text; and
   the instructions are further configured to:
      receive another voice input through the user interface, the other voice input comprising a third voice command that describes a location to place a cursor on the interface;
      determine, based on the radar data, another gesture by the user, the other gesture comprising a second pinch gesture; and
      responsive to determining the second pinch gesture, perform another operation on the selected text, the other operation comprising pasting the selected text at the location described by the third voice command.

27. The electronic device of claim 15, wherein the radar system further comprises a digital beamformer and an angle estimator, and the radar system is configured to monitor angles in a field of view between approximately −90 degrees and approximately 90 degrees.

28. The electronic device of claim 15, wherein the electronic device comprises a smartphone.

29. The electronic device of claim 15, wherein the electronic device comprises at least one of:
   a tablet computer;
   a laptop computer;
   a desktop computer;
   a computing watch;
   computing spectacles;
   a gaming system;
   a home appliance;
   a vehicle;
   a television;
   an entertainment system;
   a home-automation and control system; or
   a home security system.

30. An electronic device, comprising:
   a display;
   a radar system, implemented at least partially in hardware, configured to:
      provide a radar field;
      sense reflections from an object in the radar field;
      analyze the reflections from the object in the radar field; and
      provide, based on the analysis of the reflections, radar data;
   one or more computer processors; and
   one or more computer-readable media having instructions stored thereon that, responsive to execution by the one or more computer processors, implement a radar-based application configured to:
      present an augmented-reality (AR) element through the display of the electronic device, the AR element including a touch input control and related to a real object, an image of which is presented on the display; and
      responsive to a determination, based on the radar data, that the object in the radar field is moving toward the display, maintain the touch input control at a fixed location on the display of the electronic device.

31. The electronic device of claim 30, wherein the object in the radar field comprises a user, and whereby ease and accuracy of the user's interaction with the touch input control are facilitated by maintaining the touch input control at the fixed location even as the image of the real object is moving unsteadily on the display.

32. The electronic device of claim 31, wherein the radar-based application is further configured to present the augmented-reality (AR) element, including the touch input control, while the user holds the electronic device with a first hand.

33. The electronic device of claim 32, wherein:
the determination that the object in the radar field is moving toward the display comprises determining that the user is reaching toward the electronic device with a second hand;
the electronic device is positioned such that the image of the real object is no longer being presented on the display; and
the radar-based application is further configured to maintain the AR element and the touch input control at approximately a same location on the display as presented prior to the user moving the electronic device such that the image of the real object is no longer presented on the display.

34. The electronic device of claim 33, wherein:
the touch input control has been activated via a prior touch input by the second hand;
the radar-based application is further configured to present on the display, responsive to the activation of the touch input control, a two-dimensional (2D) interface that includes:
another image of the real object; and
another touch input control that provides the user with information about the real object.

35. The electronic device of claim 30, wherein the radar-based application is further configured to maintain the fixed location of the touch input control when the image of the real object is no longer presented on the display.

36. The electronic device of claim 30, wherein the radar-based application is further configured, responsive to the touch input control at the fixed location not being touched within a threshold time, to stop providing the touch input control at the fixed location.

37. The electronic device of claim 30, wherein the radar-based application is further configured to provide the touch input control at the fixed location if the object in the radar field is moving toward the display at a velocity that exceeds a threshold velocity.

38. The electronic device of claim 30, wherein the electronic device includes an image-capture device and the radar-based application presents, via the image-capture device, the image of the real object in real time or near-real time.

39. The electronic device of claim 30, wherein the radar system is further configured to determine, based on the radar data, that the object in the radar field is moving toward the display.

40. The electronic device of claim 30, wherein the radar-based application is further configured to determine, based on the radar data, that the object in the radar field is moving toward the display.

41. The electronic device of claim 30, wherein the object in the radar field comprises a body part of a user.

42. The electronic device of claim 30, wherein the electronic device comprises a smartphone.

43. The electronic device of claim 30, wherein the electronic device comprises at least one of:
a tablet computer;
a laptop computer;
a desktop computer;
a computing watch;
computing spectacles;
a gaming system;
a home appliance;
a vehicle;
a television;
an entertainment system;
a home-automation and control system; or
a home security system.

44. A system, comprising:
an electronic device that includes a display;
a radar system, implemented at least partially in hardware, configured to:
provide a radar field;
sense reflections from an object in the radar field;
analyze the reflections from the object in the radar field; and
provide, based on the analysis of the reflections, radar data;
one or more computer processors; and
one or more computer-readable media having instructions stored thereon that, responsive to execution by the one or more computer processors, implement a radar-based application configured to:
present an augmented-reality (AR) element through the display of the electronic device;
receive a touch input made through the display of the electronic device, the touch input effective to select the AR element;
determine, after selection of the AR element and based on the radar data, a gesture by the object in the radar field; and
perform an action related to the selected AR element, the action corresponding to the determined gesture.

45. The system of claim 44, wherein the determined gesture comprises a three-dimensional (3D) gesture.

46. The system of claim 44, wherein the object comprises a body part of the user.

47. The system of claim 44, wherein the determined gesture comprises changing a distance between the object and the radar system.

48. The system of claim 47, wherein:
the action corresponding to the changed distance being an increased distance between the object and the radar system comprises a movement of the selected AR element closer to the user; and
the action corresponding to the changed distance being a decreased distance between the object and the radar system comprises a movement of the selected AR element away from the user.

49. The system of claim 48, wherein:
the movement of the selected AR element closer to the user is proportional to the increased distance; and
the movement of the selected AR element away from the user is proportional to the decreased distance.

50. The system of claim 44, wherein the determined gesture comprises changing a position of the object, relative to the radar system, while maintaining a substantially similar distance between the body part and a plane of the display of the electronic device.

51. The system of claim 50, wherein:
the action corresponding to changing the position in a first direction comprises a rotation of the selected AR element in a first rotational direction about an axis of the selected AR element; and
the action corresponding to changing the position in a second direction comprises a rotation of the selected AR element in a second rotational direction about the axis.

52. The system of claim 44, wherein the radar system further comprises a digital beamformer and an angle estimator, and the radar system is configured to monitor angles in a field of view between approximately −90 degrees and approximately 90 degrees.

53. The system of claim 44, wherein the electronic device comprises a smartphone.

54. The system of claim 44, wherein the electronic device comprises at least one of:
   a tablet computer;
   a laptop computer;
   a desktop computer;
   a computing watch;
   computing spectacles;
   a gaming system;
   a home appliance;
   a vehicle;
   a television;
   an entertainment system;
   a home-automation and control system; or
   a home security system.

55. A method implemented in an electronic device that includes a display, a radar system, and a radar-based application, the method comprising:
   providing, by the radar system, a radar field;
   sensing, by the radar system, reflections from an object in the radar field;
   analyzing the reflections from the object in the radar field;
   providing, based on the analysis of the reflections, radar data;
   presenting, by the radar-based application, an augmented-reality (AR) element through the display of the electronic device, the AR element including a touch input control and related to a real object, an image of which is presented on the display; and
   responsive to a determination, based on the radar data, that the object in the radar field is moving toward the display, maintaining the touch input control at a fixed location on the display,
   wherein the electronic device comprises at least one of a smartphone, a tablet computer, a laptop computer, a desktop computer, a computing watch, computing spectacles, a gaming system, a home appliance, a vehicle, a television, an entertainment system, a home-automation and control system, or a home security system.

56. The method of claim 55, wherein the determination, based on the radar data, that the object in the radar field is moving toward the display is made by the radar system or by the radar-based application.

57. The method of claim 55, wherein the electronic device comprises a handheld device, the object in the radar field comprises a user, and the method further comprises:
   maintaining the touch input control at the fixed location even as the image of the real object is moving unsteadily on the display, whereby ease and accuracy of the user's interaction with the touch input control are facilitated.

58. The method of claim 57, further comprising: presenting, by the radar-based application, the augmented-reality (AR) element, including the touch input control, while the user holds the electronic device with a first hand.

59. The method of claim 58, wherein:
   the determination that the object in the radar field is moving toward the display comprises determining that the user is reaching toward the electronic device with a second hand;
   the electronic device is positioned such that the image of the real object is no longer being presented on the display; and
   the method further comprises: maintaining, by the radar-based application, the AR element and the touch input control at approximately a same location on the display as presented prior to the user moving the electronic device such that the image of the real object is no longer presented on the display.

60. The method of claim 59, wherein the touch input control has been activated via a prior touch input by the second hand, and the method further comprises:
   responsive to the activation of the touch input control, presenting on the display, by the radar-based application, a two-dimensional (2D) user interface, the 2D user interface including:
   another image of the real object; and
   another touch input control that provides the user with information about the real object.

* * * * *